US008670336B2

(12) United States Patent
Velenko et al.

(10) Patent No.: US 8,670,336 B2
(45) Date of Patent: Mar. 11, 2014

(54) MEASURING CALL QUALITY

(75) Inventors: Mihails Velenko, Riga (LV); Christoffer Asgaard Rodbro, Stockholm (SE); Ole Mahrt, London (GB); Mart Oruaas, Tallinn (EE)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 12/800,601

(22) Filed: May 18, 2010

(65) Prior Publication Data

US 2011/0141925 A1 Jun. 16, 2011

(30) Foreign Application Priority Data

Dec. 10, 2009 (GB) .................................. 0921640.9

(51) Int. Cl.
*H04L 12/26* (2006.01)
*H04L 12/56* (2011.01)

(52) U.S. Cl.
CPC ................ *H04L 47/10* (2013.01); *H04L 43/50* (2013.01)
USPC ........................................................ 370/252

(58) Field of Classification Search
USPC .......... 370/352, 401, 389, 252; 379/205, 219, 379/220.01
See application file for complete search history.

(56) References Cited

U.S. PATENT DOCUMENTS

| 7,002,919 | B1 | 2/2006 | El-Sayed | |
| 7,263,095 | B1 | 8/2007 | Sarkar | |
| 2004/0015547 | A1* | 1/2004 | Griffin et al. | 709/204 |
| 2004/0179515 | A1 | 9/2004 | Kamani et al. | |
| 2005/0190792 | A1* | 9/2005 | Dunk | 370/469 |

(Continued)

FOREIGN PATENT DOCUMENTS

| EP | 1 876 758 A2 | 1/2008 |
| JP | 2005079664 A | 3/2005 |

(Continued)

OTHER PUBLICATIONS

Great Britain Search Report, GB0921640.9, date of search Feb. 16, 2010.
Notification of Transmittal of the International Search Report and the Written Opinion of the International Searching Authority, or the Declaration from International Application No. PCT/EP2010/069243; 12 pp., Date of Mailing: Mar. 4, 2011.

*Primary Examiner* — Pao Sinkantarakorn
*Assistant Examiner* — Richard K Chang
(74) *Attorney, Agent, or Firm* — Sonia Cooper; Jim Ross; Micky Minhas

(57) ABSTRACT

Provided is a method, computer program product, and apparatus for estimating the quality of a call in which a first user terminal will comprise an end point. The method comprises establishing an end-to-end connection between a first user terminal and a node, which end-to-end connection is via an access point of a network by which the first user terminal is connected to the network; displaying information indicative of an expected quality of a call in which the first user terminal will comprise an end point, in dependence on information indicative of the quality of the end-to-end connection; and providing call initiation means for enabling a user to then selectively establish a call between the first user terminal and a callee. Also provided is a method, computer program product, and apparatus for estimating the quality of a call between a first user terminal and a potential callee.

32 Claims, 9 Drawing Sheets

(56) References Cited

U.S. PATENT DOCUMENTS

| | | |
|---|---|---|
| 2005/0286504 A1* | 12/2005 | Kwon .................... 370/356 |
| 2006/0114887 A1 | 6/2006 | Kashimoto |
| 2006/0250955 A1* | 11/2006 | Kallio .................... 370/229 |
| 2008/0031425 A1 | 2/2008 | Glynn et al. |
| 2008/0049637 A1 | 2/2008 | Morrill et al. |
| 2008/0133580 A1* | 6/2008 | Wanless et al. ........... 707/102 |
| 2008/0291896 A1* | 11/2008 | Tuubel et al. ............. 370/352 |
| 2009/0268718 A1 | 10/2009 | Liao et al. |
| 2011/0090788 A1* | 4/2011 | Hicks, III ................ 370/228 |

FOREIGN PATENT DOCUMENTS

| | | |
|---|---|---|
| WO | WO 99/11051 | 3/1999 |
| WO | WO 01/89142 A2 | 11/2001 |
| WO | WO 2005/008524 A1 | 1/2005 |
| WO | WO 2005/009019 A2 | 1/2005 |
| WO | WO 2007/125413 A2 | 11/2007 |

* cited by examiner

MEASURING CALL QUALITY

RELATED APPLICATION

This application claims priority under 35 U.S.C. §119 or 365 to Great Britain, Application No. 0921640.9, filed Dec. 10, 2009. The entire teachings of the above application are incorporated herein by reference.

TECHNICAL FIELD

The present invention relates to a method for measuring the quality of a call, to a computer program product for implementing the method, when executed, and to an apparatus for measuring the quality of a call.

BACKGROUND

Some communication systems allow the user of a communication device, such as a personal computer (PC), to communicate across a packet-based computer network, such as the Internet. Such communication systems include voice over Internet protocol ("VoIP") systems. These systems are beneficial to the user as they are often of significantly lower cost than conventional fixed line or mobile telecommunication networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communication connections can subsequently be set up and routed between users of the P2P system without the further use of a server in the set-up. Instead, the client looks up the required IP addresses from information distributed amongst the P2P client software on other end users' computers within the P2P system. That is, the address look-up list is distributed amongst the peers themselves. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in an at least partially decentralized manner based on distributed address look-up and/or the exchange of one or more digital certificates, without using a server for those purposes. Further details of an example P2P system can be found in WO 2005/009019.

Alternatively to running the client software on a PC, it is also known to run the client software on a mobile communication device, such as a mobile phone. VoIP or other packet-based communications can also be implemented using non-P2P systems that do use centralized call set-up and/or authentication, e.g. via a server or mobile telecommunications network.

Communication systems employing VoIP, or similar protocols, are subject to many factors which may adversely affect call quality. Thus, when a caller has set up a call with a callee, they might find that the call quality is below their previous expectations. For example, data packets may be lost when communication data is transmitted via the communication network. If the round trip time (RTT) for the data between users is great, then a user may experience delay in receiving information. Call quality may be affected by one or more of bottlenecks in the communication network, amount of traffic in the communication network, bandwidth or data rate limitations imposed by the caller's and/or callee's Internet Service Providers (ISPs), national firewalls, and bandwidth or data rate limitations of the "last mile" of a call-participant's connection to the communication network.

Call quality may also be affected by factors attributable to the device on which a user receives data. For example if the device is a PC or a "smart" mobile telephone, the number of applications running will affect the degree to which the central processing unit (CPU) of the device may process communication data, thereby affecting call quality.

Poor call quality can be frustrating for a user, and can cause him or her to seek alternative communication methods.

SUMMARY

It is an aim of some embodiments of the present invention to address one or more of these problems.

Accordingly, one aspect of the present invention may provide a method for estimating the quality of a call in which a first user terminal will comprise an end point, the method comprising establishing an end-to-end connection between a first user terminal and a node, which end-to-end connection is via an access point of a network by which the first user terminal is connected to the network; displaying information indicative of an expected quality of a call in which the first user terminal will comprise an end point, in dependence on information indicative of the quality of the end-to-end connection; and providing call initiation means for enabling a user to then selectively establish a call between the first user terminal and a callee.

The method optionally comprises sending, from the first user terminal to another user terminal, information indicative of the quality of the end-to-end connection between the first user terminal and the node.

The method optionally comprises receiving, at the first user terminal from another user terminal, information indicative of the quality of a second end-to-end connection between the another user terminal and a node. Moreover, the method optionally comprises displaying information indicative of an expected quality of a call in which the first user terminal and the another user terminal will comprise the end points, on the basis of the information indicative of the quality of the end-to-end connection between the first user terminal and the node and the information indicative of the quality of the second end-to-end connection.

The node may comprise one of a server and a user terminal other than a user terminal of the callee.

The method may comprise establishing plural respective end-to-end connections between the first user terminal and a plurality of respective nodes via the access point; wherein the information indicative of the expected quality of a call in which the first user terminal will comprise an end point is determined on the basis of information indicative of the quality of the respective end-to-end connections. The plurality of respective nodes may comprise one or more of a) a plurality of user terminals, and b) a plurality of servers.

Preferably the method comprises determining, at the first user terminal, information relating to a potential callee.

Preferably the end-to-end connection between the first user terminal and the node is established in dependence on the information relating to a potential callee.

Preferably the displaying information comprises displaying information indicative of an expected quality of a call between the first user terminal and the potential callee.

Preferably the providing call initiation means comprises providing call initiation means for enabling a user to then selectively establish a call with the potential callee.

The method may comprise receiving, at the first user terminal, the information relating to the potential callee. The information relating to the potential callee may comprise an indication of an identity of the potential callee. The method optionally comprises selecting the node in dependence on the information relating to the potential callee.

The node preferably comprises a user terminal of the potential callee. The node may comprise one of a server and a user terminal other than a user terminal of the potential callee.

The method may comprise determining, at the first user terminal, the information indicative of the quality of the end-to-end connection between the first user terminal and the node.

The method may comprise receiving, at the first user terminal, the information indicative of the quality of the end-to-end connection between the first user terminal and the node.

The information indicative of the quality of the end-to-end connection between the first user terminal and the node may comprises information indicative of the quality of the end-to-end connection in an uplink direction from the first user terminal to the node, and/or in a downlink direction towards the first user terminal from the node.

The information indicative of the quality of the end-to-end connection between the first user terminal and the node preferably comprises information indicative of one or more of: a bandwidth of the end-to-end connection, round trip time over the end-to-end connection, packet loss rate over the end-to-end connection, and end-to-end throughput of a dataset with stream properties over the end-to-end connection.

The information indicative of the quality of the end-to-end connection between the first user terminal and the node may be determined using a method that comprises round trip time between the first user terminal and the node.

The information indicative of the quality of the end-to-end connection between the first user terminal and the node may be determined using a method that comprises: determining a transmission time for each of a plurality of packets in a queue received at the first user terminal, based on information received with the packets; determining a reception time for each of the plurality of packets; receiving, at an estimation function, successive sets of observations including in each set transmission time, reception time and packet size; and determining the information indicative of the quality of the end-to-end connection by using a relationship between the information indicative of the quality of the end-to-end connection, an amount of data in the queue, packet size, and an interval between packet transmissions.

The information indicative of the quality of the end-to-end connection may be determined using a method that comprises: determining a transmission time for each of a plurality of packets in a queue, each packet having a packet size based on data in the packet; receiving a reception time for each packet, based on a reception clock located at the node; receiving, at an estimation function, successive sets of observations including in each set transmission time, reception time and packet size; and determining the information indicative of the quality of the end-to-end connection by using a relationship between the information indicative of the quality of the end-to-end connection, an amount of data in the queue, packet size, and an interval between packet transmissions.

A second aspect of the present invention may provide a method for estimating the quality of a call between a first user terminal and a potential callee, the method comprising determining, at a first user terminal, information relating to a potential callee; determining an indication of the quality of an end-to-end connection between the first user terminal and the potential callee, in dependence on the information determined; displaying information indicative of an expected quality of a call between the first user terminal and the potential callee, in dependence on the indication of the quality of the end-to-end connection; and providing call initiation means for enabling a user to then selectively establish a call with the potential callee.

The method preferably comprises receiving, at the first user terminal, the information relating to the potential callee. The information relating to the potential callee may comprise an indication of an identity of the potential callee.

The method optionally comprises receiving, at the first user terminal, the indication of the quality of an end-to-end connection.

The method optionally comprises sending, from the first user terminal, information indicative of the quality of a local connection by which the first user terminal is connected to a network. The method optionally comprises receiving, at the first user terminal, information indicative of the quality of a local connection by which a second user terminal of the potential callee is connected to a network.

The determining an indication of the quality of an end-to-end connection may be in dependence on one or both of information indicative of the quality of a local connection by which the first user terminal is connected to a network, and information indicative of the quality of a local connection by which the second user terminal is connected to a network.

The call preferably comprises one or both of a voice over internet protocol call and a video over internet protocol call.

A third aspect of the present invention may provide a computer program product for estimating the quality of a call in which a first user terminal will comprise an end point, the program comprising code embodied on a computer-readable medium arranged so as, when executed on a processor, to implement a method according to the first aspect of the present invention. The method may comprise steps in accordance with any of the above-mentioned method features of the first aspect.

A fourth aspect of the present invention may provide a computer program product for estimating the quality of a call between a first user terminal and a potential callee, the program comprising code embodied on a computer-readable medium arranged so as, when executed on a processor, to implement a method according to the second aspect of the present invention. The method may comprise steps in accordance with any of the above-mentioned method features of the second aspect.

A fifth aspect of the present invention may provide an apparatus for estimating the quality of a call in which a first user terminal will comprise an end point, the apparatus comprising: means for establishing an end-to-end connection between a first user terminal and a node, which end-to-end connection is via an access point of a network by which the first user terminal is connected to the network; means for causing information indicative of an expected quality of a call in which the first user terminal will comprise an end point to be displayed, in dependence on information indicative of the quality of the end-to-end connection; and means for providing call initiation means for enabling a user to then selectively establish a call between the first user terminal and a callee. The apparatus may be configured in accordance with any of the above-mentioned method features of the first aspect.

In particular, the apparatus may comprise means for determining, at the first user terminal, information relating to a potential callee. The means for establishing the end-to-end connection between the first user terminal and the node may comprise means for establishing the end-to-end connection in dependence on the information relating to a potential callee.

The means for causing information to be displayed may comprise means for causing information indicative of an expected quality of a call between the first user terminal and the potential callee to be displayed.

The means for providing call initiation may comprise means for providing call initiation means for enabling a user to then selectively establish a call with the potential callee.

A sixth aspect of the present invention may provide an apparatus for estimating the quality of a call between a first user terminal and a potential callee, the apparatus comprising means for determining information relating to a potential callee; means for determining an indication of the quality of an end-to-end connection between the first user terminal and the potential callee, in dependence on the information determined; means for causing information indicative of an expected quality of a call between the first user terminal and the potential callee to be displayed, in dependence on the indication of the quality of the end-to-end connection; and means for providing call initiation means for enabling a user to then selectively establish a call with the potential callee. The apparatus may be configured in accordance with any of the above-mentioned method features of the second aspect.

BRIEF DESCRIPTION OF THE DRAWINGS

For a better understanding of the present invention and to show how it may be carried into effect, reference will now be made by way of example to the accompanying drawings in which.

DETAILED DESCRIPTION

Figure 1:
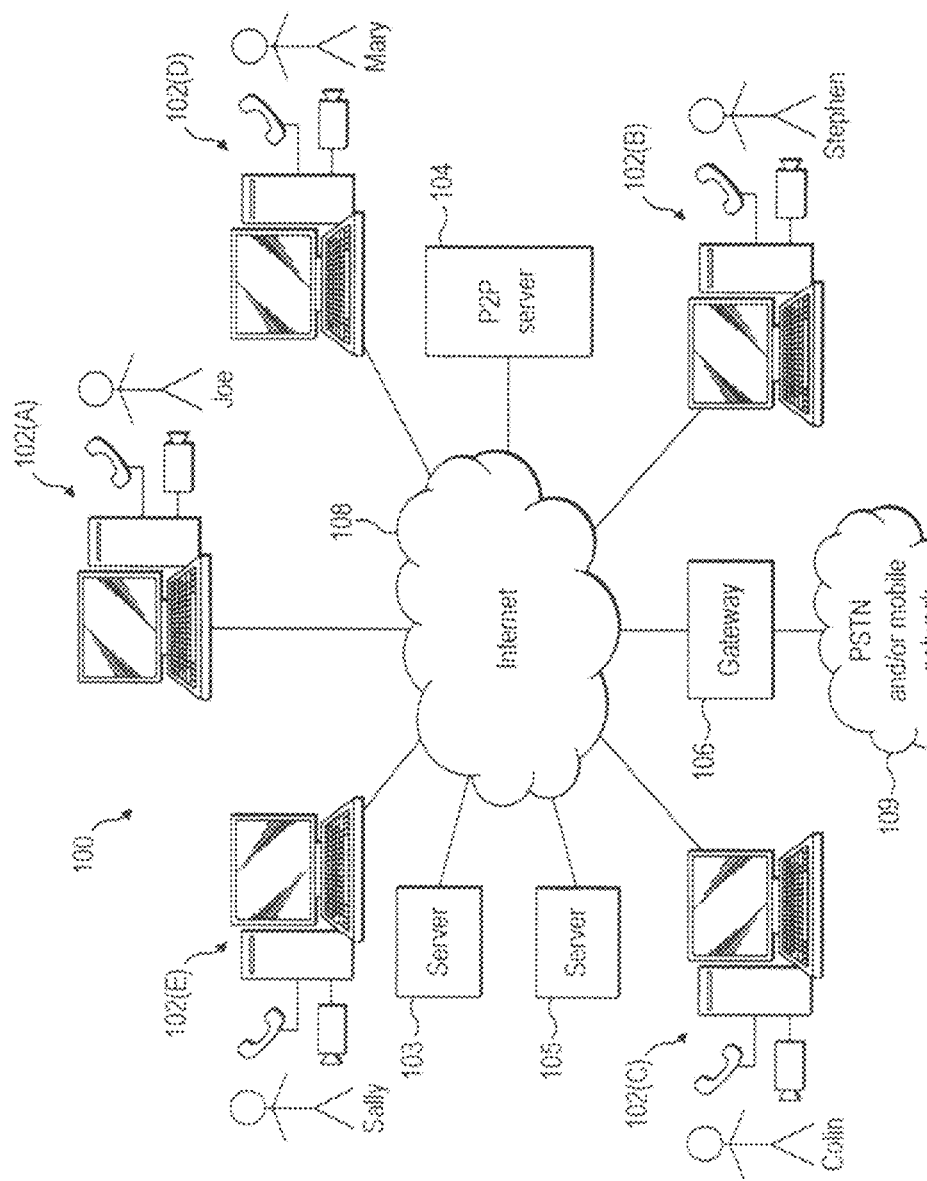
FIG. 1 is a schematic representation of a packet-based network, such as the Internet, to which a plurality of elements are connected.

As discussed above, poor call quality can be frustrating for a user. From WO2007/125413 it is known to determine call quality during a call and to take corrective action during the call.

The inventors have found that it would be advantageous to allow a user to correct potential call quality problems before setting-up a call, in order to improve the quality of the subsequently-established call. Such a system provides a way of setting a user's expectations before setting-up the call, and enhances the user experience for the user.

In some embodiments of the present invention, when a contact (i.e. a callee) is selected by a user (i.e. a caller), the quality of a network connection is determined before a call is set up. In some embodiments, the quality is determined not on the basis of the user selecting the contact, but on the basis of the user inputting into their user terminal (such as by them pressing or selecting a button) an instruction for the quality to be determined. In some embodiments, information indicative of the quality of an end-to-end connection between the caller and another node is used to display an indication of network performance to the user, and thus an indication of an expected quality of a call in which the caller's user terminal will comprise an end point. This allows the user to take corrective action and/or may set the user's call quality expectations before placing the call. In some embodiments, the information indicative of the quality of the end-to-end network connection may be used to set initial call parameters.

In some embodiments a determined bandwidth of an end-to-end connection is used to set initial call parameters such as one or more of the following: i) initial audio and/or video bandwidth assignments, ii) initial packet sizes (both time interval between, and byte size of, audio and/or video packets), and iii) an initial level of forward error correction to be applied.

In some embodiments an indication of the quality of an end-to-end connection is provided to a user, such as by displaying a score. In some embodiments, a score may be displayed to indicate an expected quality of a call. Different scores may be displayed, depending on the network conditions. In some embodiments a first score (a so-called "off call score") is allocated and indicated before a call is set up. Additionally or alternatively an explanatory message may be provided to the user to accompany the indicated "off call score". In some embodiments a second score (a so-called "on call score", which may have a different value from the "off call score") is allocated and indicated during the call. Additionally or alternatively to the "off call score", an explanatory message may be provided to the user to accompany the indicated "on call score".

Either or both of these scores may be combined with other scores relating to the device on which a user receives data during calls, such as relating to one or more of a microphone, speakers, a webcam, and a CPU of the device, to provide a "combined score" that is an indication of an overall call quality estimate. In some embodiments the combined score is displayed to a user.

In some embodiments one or more of the "off call score", "on call score" and the "combined score" is displayed in a similar way to that in which a mobile phone indicates network coverage, i.e. by using a graphic bar, the length of which bar is indicative of connection quality. Other score formats are discussed below.

In some embodiments of the present invention, one or more contact-specific measurements are taken, that is to say the quality of an end-to-end connection between the user's terminal and a contact (i.e. a potential callee), or a node that has a common characteristic (such as a common or local geographic or network location) with the potential callee, is tested. Such a node may be a server or another user terminal. In embodiments this testing is carried out when that contact is selected by a user (i.e. a potential caller). In other embodiments, the testing is performed on the basis of the user inputting into their user terminal an instruction for the quality to be determined. As described below, the end-to-end connection may be established on the basis of some determination of information relating to the potential callee, such as an identity or location of the callee. Thus, the node with which the end-to-end connection is made may be selected on the basis of the information relating to the potential callee.

The user's user terminal may, as a result, provide to the user an indication of the expected performance of a call with the potential callee. In some embodiments, data, such as randomly-generated data, is sent to the contact or the node in order to determine the bandwidth of the end-to-end connection. In that case, the contact's user terminal or the node may determine the bandwidth. In other embodiments, data is sent to the potential caller's user terminal. This may be as a result of the potential caller's user terminal sending a request for the potential callee's user terminal, or for the node, to send data to the potential caller's user terminal, which data is to be used by the potential caller's user terminal in determining the bandwidth of the end-to-end connection. In that case, the potential caller's user terminal may have means for determining the bandwidth.

In preferred embodiments, downlink bandwidth (where the downlink is in the direction towards the potential caller's user terminal from the other end of the end-to-end connection) is determined using an estimation function. In embodiments where the estimation function is provided at the potential caller's user terminal, then the potential caller's user terminal preferably includes means for determining a transmission time from a queue for each of a plurality of packets received at the potential caller's user terminal, based on information received with the packets; means for determining a reception time for each of the plurality of packets; and the estimation function arranged to receive successive sets of observations including in each set transmission time, reception time and packet size, wherein the estimation function is preferably arranged to determine the bandwidth of the end-to-end connection with the potential callee's user terminal or with the node by using a relationship between the bandwidth, an amount of data in the queue, packet size, and an interval between packet transmissions.

Although different specific relationships between these values may be used in alternative embodiments, in some embodiments a specific relationship used by the estimation function is:

$$N(k,i)=\max(N(k-1,i)+CT(k,i)-(Tx(k,i)-Tx(k-1,i))*BW_{DN}(i),0)+S(k,i)$$

where $N(k,i)$ is the amount of data in the packet queue at time $Tx(k,i)$, $BW_{DN}$ is the downlink bandwidth, $S(k,i)$ is the packet size and $CT(k,i)$ denotes any cross-traffic received from nodes other than the transmitter of the data.

In preferred embodiments, uplink bandwidth (where the uplink is in the direction away from the potential caller's user terminal towards the other end of the end-to-end connection) is determined using an estimation function. In embodiments where the estimation function is provided at the potential caller's user terminal, then the potential caller's user terminal preferably includes means associated with a queue of packets ready for transmission, each packet having a packet size based on data in the packet; means for determining a transmission time for each packet; means for receiving a reception time for each packet, based on a reception clock located at the potential callee's user terminal or the node; and the estimation function arranged to receive successive sets of observations including in each set transmission time, reception time and packet size, wherein the estimation function is arranged to determine the bandwidth of the end-to-end connection with the potential callee's user terminal or with the node by using a relationship between the bandwidth, an amount of data in the queue, packet size, and an interval between packet transmissions.

In some embodiments a specific relationship used by the estimation function is:

$$N(k,i)=\max(N(k-1,i)+CT(k,i)-(Tx(k,i)-Tx(k-1,i))*BW_{UP}(i),0)+S(k,i)$$

where $N(k,i)$ is the amount of data in the packet queue at time $Tx(k,i)$, $BW_{UP}$ is the uplink bandwidth, $S(k,i)$ is the packet size and $CT(k,i)$ denotes any cross-traffic from the transmitter of the data.

In some embodiments, the uplink bandwidth is determined at the potential callee's user terminal or the node that has the common characteristic with the potential callee (i.e. the receiver of the packets), optionally using a similar estimation function to that described above. In some embodiments, the downlink bandwidth is determined at the potential callee's user terminal or at the node, optionally using a similar estimation function to that described above. In the latter case, the potential callee's user terminal or the node, respectively, includes means for receiving a reception time for each packet received at the potential caller's user terminal.

In some embodiments, the uplink and/or downlink bandwidth is additionally or alternatively determined using RTT. Other known methods of estimating bandwidth or connection quality that fall within the scope of the present invention will be apparent to the skilled person, but some examples are provided below.

In some embodiments of the present invention, one or more non-contact-specific measurements are taken, that is to say the quality of one or more end-to-end connections with contact(s), or nodes other than a potential callee's user terminal and other than a node that has the common characteristic with a potential callee's user terminal, are tested. This allows an indication of an expected quality of a call in which the caller's user terminal will comprise an end point to be displayed, and may provide at least some information on the local network connection of the caller's user terminal to the network. An estimate of the user terminal's local connection to the network may be obtained, based on the results of testing the end-to-end connections, as discussed below.

The end-to-end connection between the caller's user terminal and the non-contact-specific contact or node is a connection that passes via an access point of the network, by which access point the caller's user terminal is connected to the network. That is to say the non-contact-specific contact or node is a node behind the access point from the point of view of the caller's user terminal, and thus the access point is between the caller's user terminal and the non-contact-specific contact or node, such that the access point is not at one end of the end-to-end connection.

In some embodiments this testing is carried out when a contact (and not necessarily the random contact) is selected by a user as a potential callee. In some embodiments the testing is carried out when a selection of a contact changes. In other embodiments, the quality of the end-to-end connection is determined at predetermined intervals or when the user inputs into their user terminal an instruction for the quality to be determined. In some embodiments the quality of connections with a plurality of contacts is tested and the connection with the highest quality is determined.

The bandwidth(s) of the end-to-end connection(s) with the random contact(s) is, in some embodiments, determined using an estimation function in a similar manner to that described above, except that data is sent to each of the random contact(s) (rather than to the potential callee's user terminal or to the node that has the common characteristic with the potential callee's user terminal). In some embodiments, the bandwidth is additionally or alternatively determined using RTT. Other known methods of estimating bandwidth are used in still further embodiments.

In some embodiments of the present invention, one or more server measurements are taken, that is to say the quality of an end-to-end connection with a server is tested. In that case, an estimate of the user terminal's local connection to the network may be obtained, based on the result of testing the end-to-end connection with the server. In preferred embodiments the server is running an instance of a VoIP communications client application. In some embodiments, a session is set up between the user's user terminal and the server. This may occur at predetermined intervals, or each time a contact (i.e. potential callee) selection is made (or changes), or when the user inputs into their user terminal an instruction for the connection quality to be determined. Alternatively a permanent session (i.e. lasting for the duration that the user terminal is logged onto the network) is set up. In some embodiments the testing is carried out when a contact is selected by a user. In some embodiments the testing is carried out when a selection of a contact changes. In other embodiments, the quality of the end-to-end connection is determined at predetermined intervals, or when the user inputs into their user terminal an instruction for the testing to be carried out. The user's user terminal may as a result provide to the user an indication of the performance of the end-to-end connection with the server, and/or an indication of the an expected quality of a call in which the user's user terminal will comprise an end point.

During one of these sessions, in some embodiments, data, such as randomly-generated data, is sent to the server in order to determine the quality of the end-to-end connection with the server. The data may be sent at predetermined intervals, or each time a contact selection is made (or changes), or when the user inputs into their user terminal an instruction for the end-to-end connection quality to be determined. In some embodiments the bandwidth of the connection with the server is determined. In some embodiments the bandwidth is determined using an estimation function in a similar manner to that described above, except that data is sent to the server (rather than to a selected potential callee or node that has the common characteristic with the potential callee's user terminal). In some embodiments, the bandwidth is determined using RTT.

Other known methods of estimating bandwidth that fall within the scope of the present invention will be apparent to the skilled person.

In preferred embodiments of the invention there may be more than one server against which the user terminal tests an end-to-end connection, whether by use of an estimation function as described above, RTT, or other method. In that case, an estimate of the user terminal's local connection to the network may be obtained, based on the results of testing the end-to-end connections with the servers. In this case the most local (either geographically or in terms of network connections) server to the caller or to a potential callee may be selected by querying a lookup table with its IP address. In preferred embodiments, when communication software in the form of a VoIP communications client application is running at the caller's user terminal, regular updates as to the quality of the end-to-end connection(s) may be suspended when the VoIP client application is out of focus.

In some embodiments of the present invention end-to-end server-generated measurements are taken. In this case, each of a plurality of user terminals tests its respective end-to-end connection with a server. These tests are each substantially as described above. The plurality of user terminals share measurements of the performance of their respective end-to-end connections (optionally with presence information) with each other. A determination as to which of the end-to-end connections has the higher quality and/or lowest quality may then be made. In some embodiments the sharing of measurements is performed when a contact (i.e. potential callee) is selected by a user of a user terminal (i.e. a potential caller). In preferred embodiments, the sharing is performed when the user inputs into their user terminal an instruction for an indication of expected call quality to be displayed. In any event, in some embodiments an indication of expected call quality of a call between the user's user terminal and a user terminal of the plurality of user terminals is displayed, on the basis of the shared measurements.

Examples of a suitable communication system and communications client for the implementation of some embodiments of the invention will now be described.

FIG. 1 is a schematic illustration of a packet-based network such as the Internet, to which a plurality of elements such as those labelled 102, 103, 104 and 106 are connected. Each element is inter-coupled with the rest of the Internet 108, and is configured to communicate data with other such elements over the Internet by transmitting and receiving data in the form of Internet Protocol (IP) packets. Each element also has an associated IP address. The elements shown explicitly in FIG. 1 are: a plurality of end-user terminals 102(A) to 102(E), such as desktop or laptop PCs or Internet-enabled mobile telecommunication devices (such as mobile phones); one or more servers 103, 105; one or more P2P servers 104; and a gateway 106 to another type of network 109 such as to a traditional Public-Switched Telephone Network (PSTN) or other circuit switched network, and/or to a mobile telecommunications network, such as a mobile cellular network.

It will of course be appreciated that many more elements make up the Internet than those explicitly shown. This is represented schematically in FIG. 1 by a communications cloud 108, which will include many terminals, servers and gateways, as well as routers of Internet service providers (ISPs) and Internet backbone routers. However, in some embodiments only one end-user terminal 102(A) is connected to the Internet 108. In some embodiments there may be one, none or more than two of the servers 103, 105 connected to the Internet 108. In some embodiments the P2P server 104 is omitted.

End-user terminal 102(A) is connected to the packet-based network 108 via an access point (not shown) in the network 108. The end-to-end connections between the user terminal 102(A) and other elements 102, 103, 104 and 106 discussed above are then formed via this access point. In other words, the other elements 102, 103, 104 and 106 are nodes behind the access point from the point of view of the user terminal 102(A), and thus the access point is between the user terminal 102(A) and the nodes, such that the access point is not at an end of any of the end-to-end connections. The end points of the respective end-to-end connections are the user terminal 102(A) and one of the other nodes 102, 103, 104 and 106.

Each of a plurality of the end-user terminals 102 is installed with communication software in the form of a P2P communications client application. When executed, this allows the end-user terminals 102 to establish bidirectional communication channels with other such end-user terminals 102 via the Internet using P2P call set-up (or more generally connection set-up). In some embodiments the P2P communications clients share presence information with one another, which provides an availability status of users. The presence information for each user is preferably at least in part defined by the user themselves. To supplement the decentralized call set-up, the P2P communications client may retrieve some additional information from the P2P server 104, such as contact lists which provide the names and user IDs of the users' contacts, and "avatars" which are images chosen by users to represent themselves within the P2P system.

There may also be a P2P communications client installed at one or more gateways 106 coupled to both the Internet 108 and one or more other networks 109 such as a PSTN network and/or a mobile telecommunications network. This allows the P2P communications clients running on end-user terminals 102 to communicate with ordinary land-line telephones and/or mobile telephones (or other mobile telecommunication devices) respectively, even if those telephones themselves do not run P2P communications clients and are not directly coupled to the Internet. In that case, the P2P communications client on the terminal 102 sets up a connection over the Internet with the P2P communications client on the gateway 106 using P2P call set-up and provides it with a phone number, and the gateway 106 uses the phone number to set up a connection with the telephone over the respective other PSTN or mobile telecommunications network. Or in the other direction, a telephone user in one of the PSTN or mobile telecommunications network may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile telecommunications network.

In some embodiments the end-user terminals 102 can communicate with the server(s) 103, 105. In that case, the user terminals 102 can set-up end-to-end connections over the Internet 108 with the servers 103,105. There may be a P2P communications client installed and running at one or more of the servers 103, 105.

Figure 2:
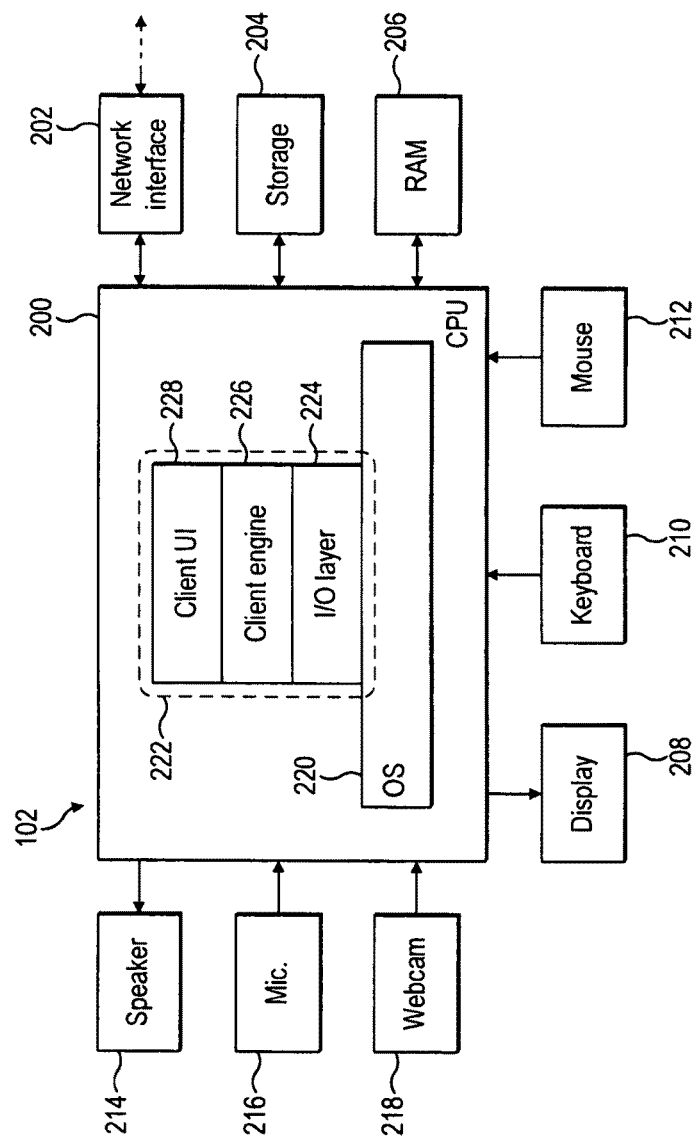
FIG. 2 is a schematic block diagram of a user terminal installed with a P2P communications client, according to an embodiment of the present invention.

The schematic block diagram of FIG. 2 shows an example of a first end-user terminal 102 that is configured to act as a terminal of a P2P system operating over the Internet 108, according to an embodiment of the present invention. The user terminal 102 comprises a processor or CPU 200 operatively coupled to: a network interface 202 such as modem for connecting to the Internet 108 via a local network connection, a non-volatile storage device 204 such as a hard-drive or flash memory, and a volatile memory device such as a random access memory (RAM) 206. The user terminal 102 also comprises one or more user input devices, for example in the form of a keyboard or keypad 210, a mouse 212, a microphone 216 and a webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, and packet-based communication software in the form of a P2P communications client 222. On start-up or reset of the terminal 102, the operating system software 220 is automatically loaded into the RAM 206 and from there is run by being executed on the CPU 200. Once running, the operating system 220 can then run applications such as the P2P communications client 222 by loading them into the into the RAM 206 and executing them on the CPU 200. To represent this schematically in FIG. 2, the operating system 220 and P2P communications client 222 are shown within the CPU 200.

The P2P communications client 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2. The P2P communications client 222 is said to be run "on" the operating system 220. This means that in a multi-tasking environment it is scheduled for execution by the operating system 220, and further that inputs to the lowest (I/O) layer 224 of the P2P communications client 222 from the input devices 202, 216, 218 and 230 as well as outputs from the I/O layer 224 to the output devices 202, 208, 214 and 230 may be mediated via suitable drivers and/or APIs of the operating system 220.

The I/O layer 224 of the P2P communications client comprises a voice engine and optionally a video engine in the form of audio and video codecs which receive incoming encoded stream(s) and decode them for output to speaker 214 and/or display 208 as appropriate, and which receive unencoded audio and/or video information from the microphone 216 and/or webcam 218 and encode them for transmission as streams to other end-user terminal(s) 102 of the P2P system. The I/O layer 224 may also comprises a control signalling protocol for signalling control information between terminals 102 of the network.

The client engine 226 handles the connection management functions of the P2P system as discussed above, such as establishing calls or other connections by P2P address look-up and authentication. The client engine 226 may also be responsible for other secondary functions of the P2P system, such as supplying up-to-date contact lists and/or avatar images of the user to the P2P server 104, or retrieving up-to-date contact lists of the user and retrieving up-to-date avatar images of other users from the P2P server 104. Further, the client engine 226 may retrieve presence information from other client(s) of the user(s) in the contact list by periodically polling them via a public API, and reciprocally provide its own presence information when polled by those other client(s) that are online. Exchange of presence information directly between clients via a public API is the preferred option, but alternatively the presence information could be exchanged via an intermediate node, such as a server 104.

The UI layer 228 is responsible for presenting decoded video to the user via the display 208, for presenting the output on the display 208 along with other information such as presence and profile information and user controls such as buttons and menus, and for receiving inputs from the user via the presented controls.

Figure 3:
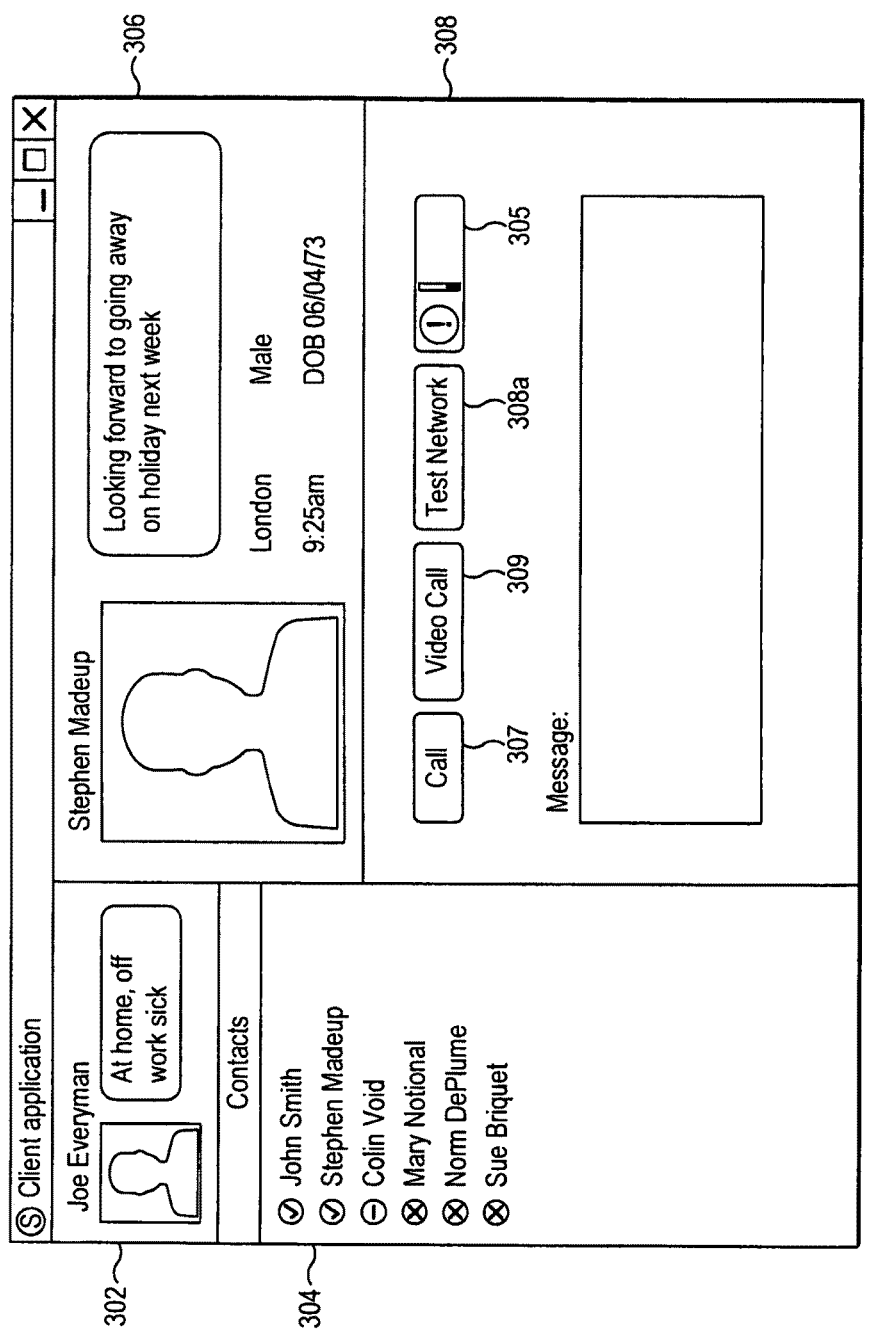
FIG. 3 is a schematic representation of a P2P communications client user interface viewed on a display of a user terminal.
Figure 4:
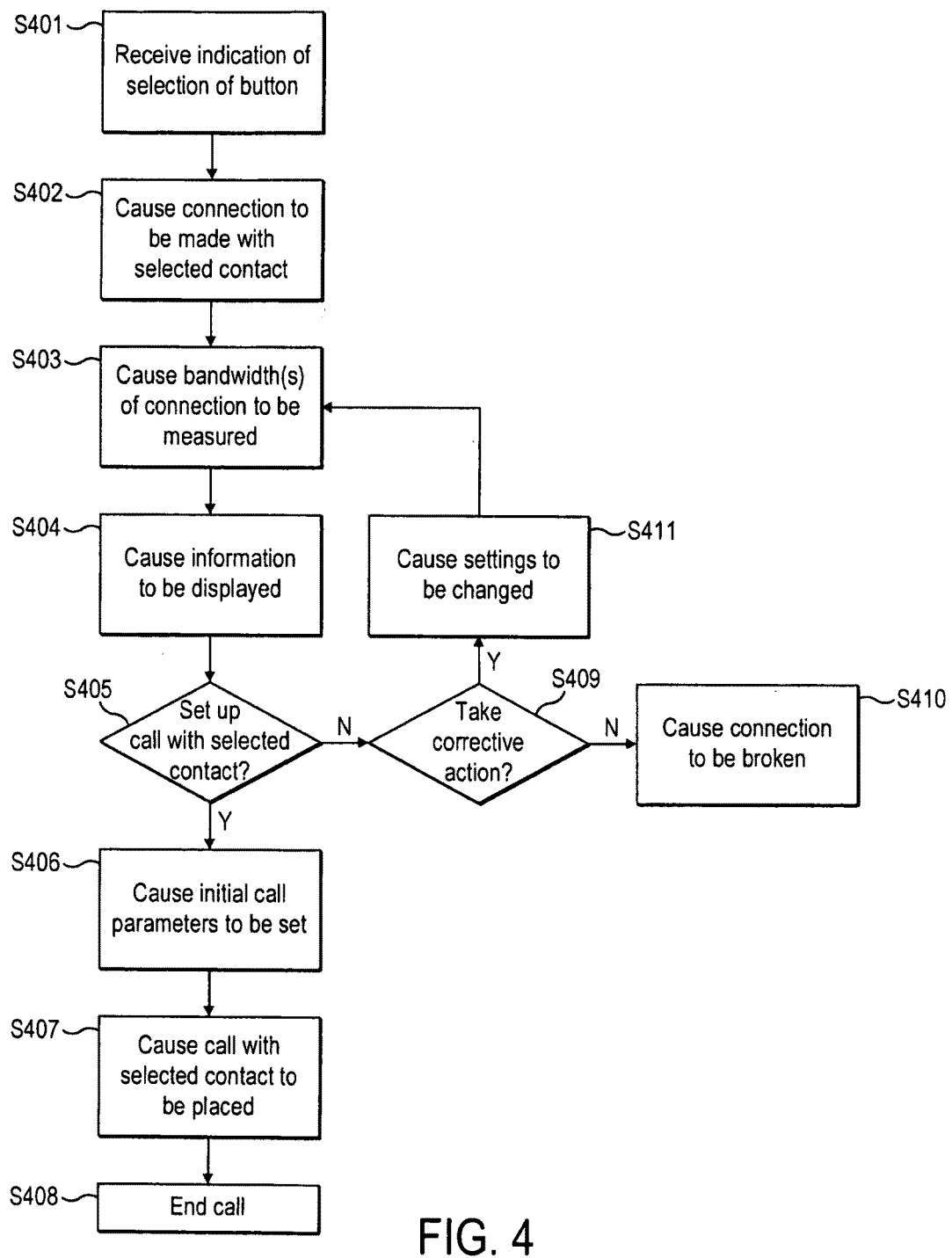
FIG. 4 is a flow chart showing a method according to an embodiment of the present invention.
Figure 5:
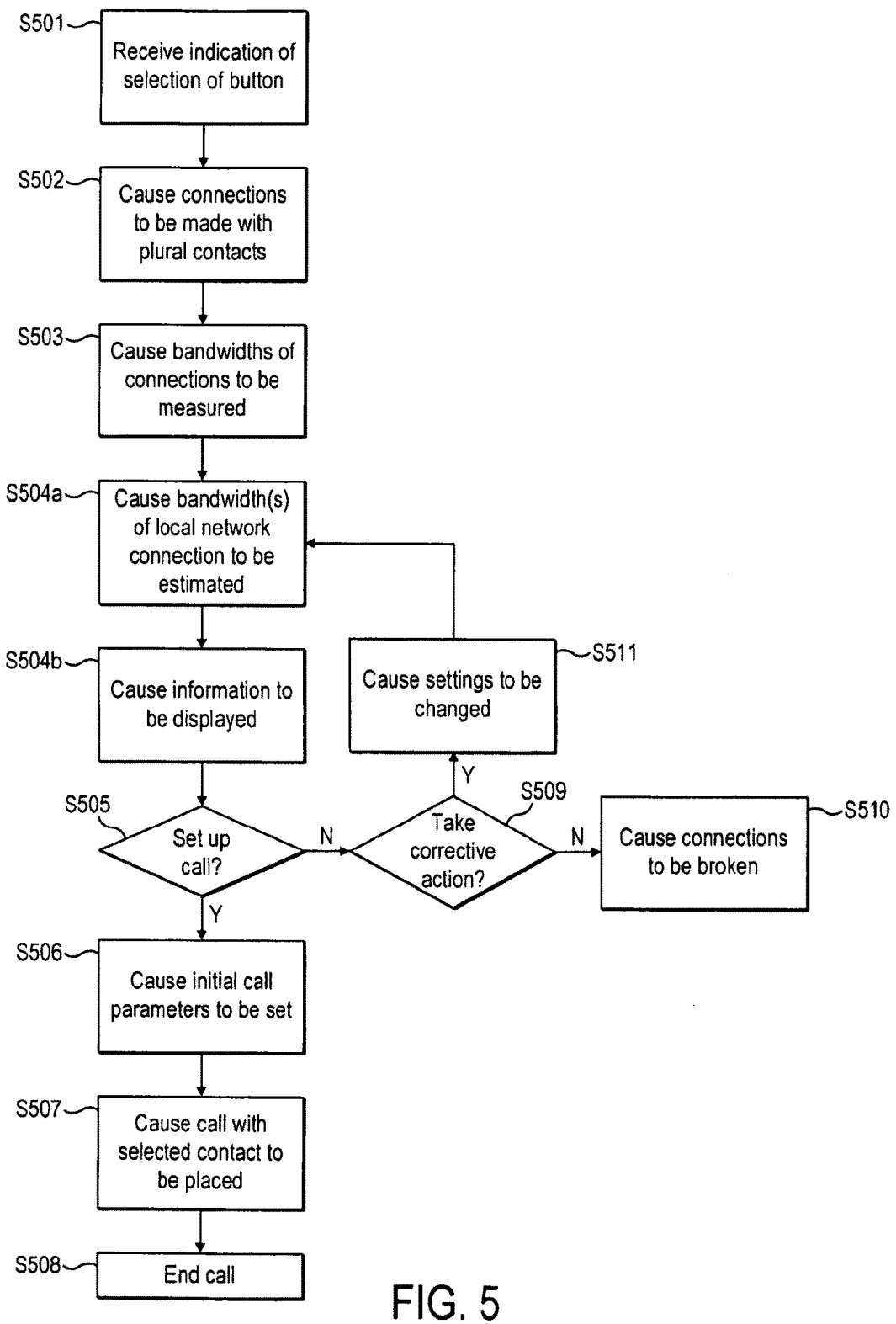
FIG. 5 is a flow chart showing a method according to another embodiment of the present invention.
Figure 6:
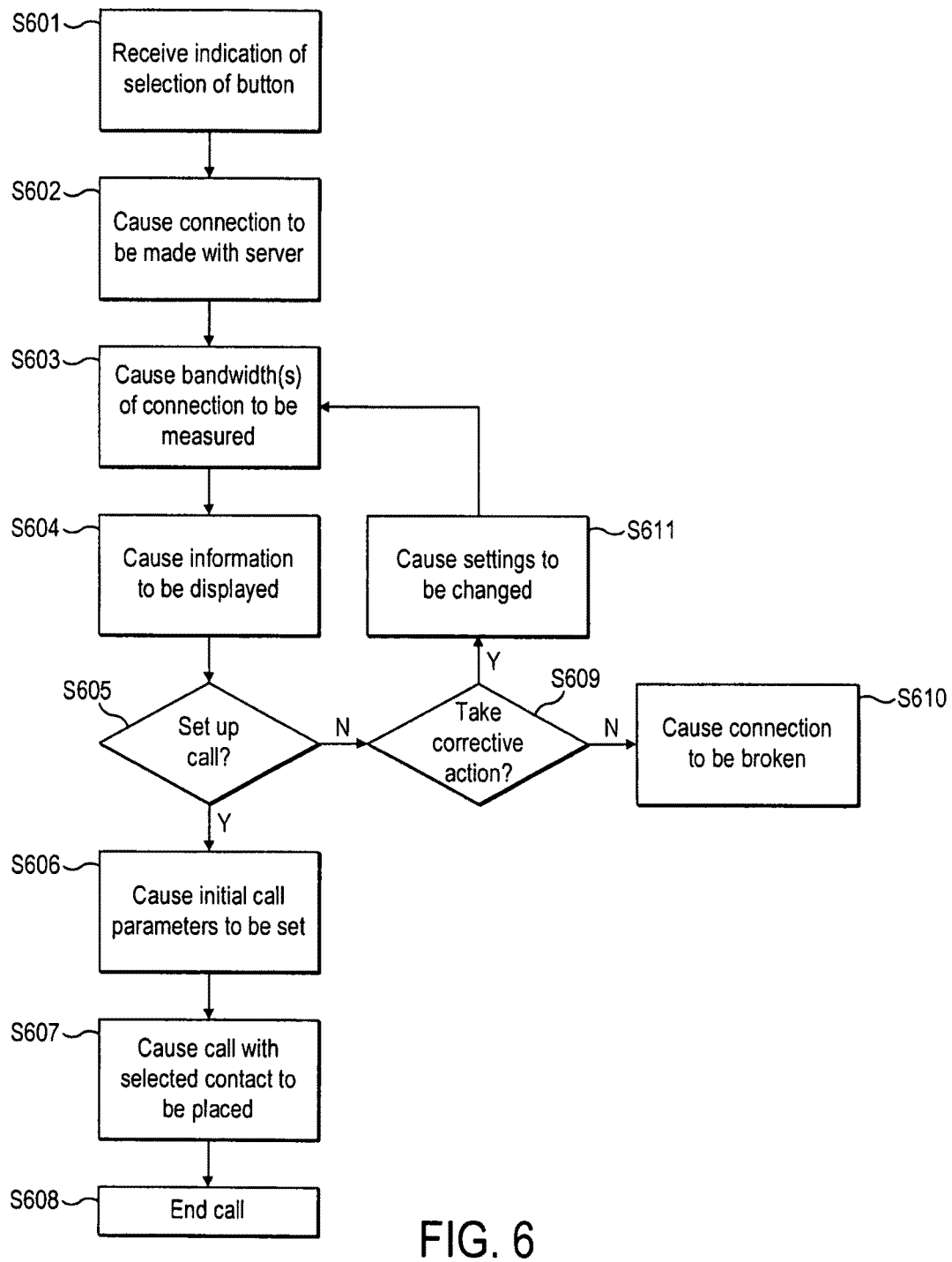
FIG. 6 is a flow chart showing a method according to a further embodiment of the present invention.
Figure 7:
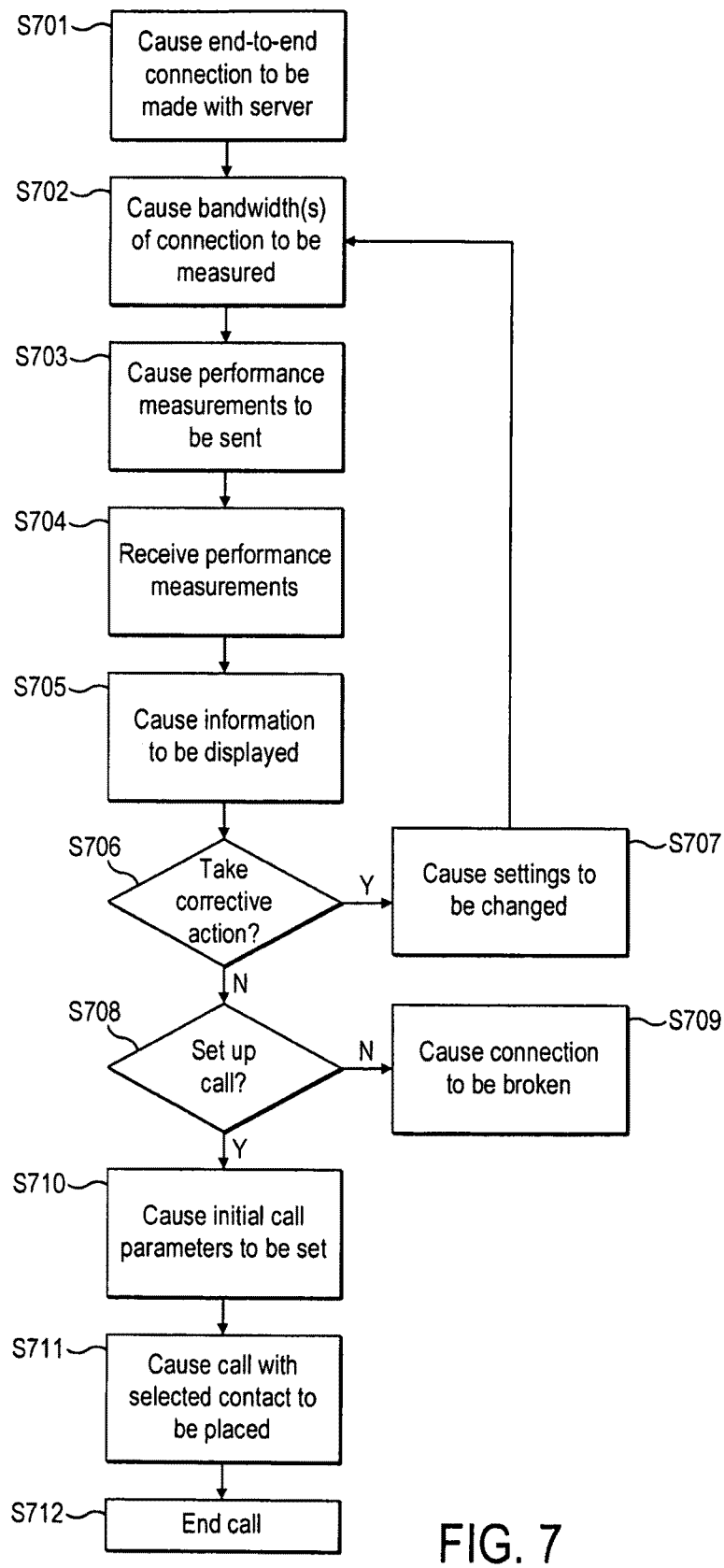
FIG. 7 is a flow chart showing a method according to another embodiment of the present invention.

FIG. 3 illustrates schematically an example user interface as would be presented to a user on the display 208 when the P2P communications client application 222 is open for viewing by the user. In this example, the user interface 228 is that of the P2P communications client 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface displays a contact list of the user's friends or associates, these being other users of the P2P network. Entry in the contact list is preferably conditional on agreement from the users. The contact list may be stored at and retrieved from the P2P server by the client engine 226, so that the same list is available to the user uses different instances P2P communications client on different terminals. Presence information is also displayed in the panel next to each contact. The presence information represents an availability status which preferably comprises an indication of whether the user is online, and preferably is at least in part user-defined. For example, the presence status may be: the user is offline (x), the user is online and has selected to be shown as available (√), or the user is online but has selected to be shown as not available (–).

A third panel 306 of the user interface displays the profile of a selected user from the contact list, in this case "Stephen Madeup", a user of another user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface then displays communication controls in relation to the selected contact, such as buttons 307, 309 allowing a voice or video call to be established with the selected contact, and a window for entering chat messages. Any incoming chat messages and chat history will be displayed in this panel also, and file transfers may be established by dragging-and-dropping files into the chat window. Also displayed in the fourth panel is an indication 305 of an expected quality of a call in which the user terminal 102(A) will be a participant, as will be described in more detail below.

First to fourth non-limiting example embodiments of the present invention are described below. In the first embodiment, the node with which the first user terminal connects (via an end-to-end connection between the first user terminal and the node) comprises the second user terminal with which a call may later selectively be established. In variations to that embodiment the node is a node that has a common characteristic with the second user terminal, such as a server local to the second user terminal. In contrast, in the second to fourth embodiments, the first user terminal connects to a node (via an end-to-end connection between the first user terminal and the node) comprising one of a server and a user terminal that is not necessarily the second user terminal or a node that has a common characteristic with the second user terminal. Only in certain cases may the node comprise specifically the second user terminal with which a call may later selectively be placed.

The first embodiment of the present invention will now be described in greater detail with reference to FIGS. 1 to 4. For the purpose of this description the user terminal 102(A) shown in FIG. 1 will be taken to be the first user terminal, i.e. the potential caller.

When the user (Joe) of the first user terminal 102(A) wishes to communicate with a user of a second user terminal 102(B), the user of the first user terminal 102(A) selects the name of the user of the second user terminal 102(B) in the second panel 304 of the user interface shown in FIG. 3. So, in this case, the user uses their mouse 212 to select the contact labelled as "Stephen Madeup". As shown in FIG. 3 and as discussed above, a profile of the selected contact is then shown in the third panel 306 of the user interface.

Following this selection, if the user of the first user terminal 102(A) wants to obtain an indication of an expected quality of a call with the user of the second user terminal 102(B) before the call is setup, they select the button 308a marked "Test network" (Note that in other embodiments, this button may be located elsewhere in the user interface, as discussed below). As a result, the client engine 226 receives an indication of the user's selection of the button (step S401 in FIG. 4), determines an address or identity of the second user terminal 102(B) (such as by address look up, as discussed above, by scanning the data that is illustrated in the user interface, or by prompting the user to enter or otherwise indicate the address or identity), and then causes an end-to-end connection to be made (step S402) between the first user terminal 102(A) and the second user terminal 102(B), via the network interface 202 of the first user terminal and thus via a local network connection between the first user terminal 102(A) and its access point of the Internet 108. It is to be noted that this end-to-end connection does not comprise a call, since no call data (e.g. audio data or video data) is exchanged over the end-to-end connection.

In other embodiments the connection is set up as a result of the user selecting the name of the user of the second user terminal 102(B), and in that case the "Test network" button is omitted.

Once the end-to-end connection between the first and second user terminals is established, the client engine 226 of the first user terminal 102(A) causes the uplink bandwidth of the end-to-end connection from the first to the second user terminals to be measured (step S403) by an estimation function at the second user terminal 102(B).

In this embodiment, the uplink bandwidth of the connection is measured by sending data packets from a queue in the network 108 to the second user terminal 102(B), wherein each packet has a packet size based on the data in the packet. A transmission time of each packet is determined based on information received at the second user terminal 102(B) with the packets. A time of reception at the second user terminal 102(B) of each packet is determined using a reception clock. In this embodiment the reception clock is located at the second user terminal 102(B). The estimation function at the second user terminal 102(B) is supplied with successive sets of observations including in each set a transmission time, a reception time and a packet size. In this embodiment the estimation function is comprised within a CPU of the second user terminal 102(B), but in other embodiments the estimation function may be comprised in a processor which is separate, but connected to, the CPU.

The estimation function is arranged to provide an estimate of the uplink bandwidth of the end-to-end connection between the two user terminals using a relationship between the estimated uplink bandwidth, the amount of data in the queue, packet size, and the interval between packet transmissions. Although different specific relationships between these values may be used in alternative embodiments, in this embodiment a specific relationship used by the estimation function is:

$$N(k,i)=\max(N(k-1,i)+CT(k,i)-(Tx(k,i)-Tx(k-1,i)) *BW_{UP}(i),0)+S(k,i)$$

where N(k,i) is the amount of data in the channel packet queue at time Tx(k,i), $BW_{UP}$ is the uplink bandwidth, S(k,i) is the packet size and CT(k,i) denotes any cross-traffic from the transmitter of the data.

In this embodiment the data comprised in the sent packets is data that is randomly generated, but in alternative embodiments the data may be predetermined and of fixed content. In some embodiments the data conveys information, such as an avatar update.

Once the uplink bandwidth has been so measured, the second user terminal 102(B) provides the first user terminal 102(A) with an indication of the uplink bandwidth.

In this embodiment, the client engine 226 of the first user terminal 102(A) also causes the downlink bandwidth of the end-to-end connection from the second to the first user terminals to be measured (step S403) by an estimation function at the first user terminal 102(A). In this embodiment, the downlink bandwidth of the connection is measured by sending data packets from a queue in the network 108 to the first user terminal 102(A), wherein each packet has a packet size based on the data in the packet. The client engine 226 of the first user terminal 102(A) causes a request to be sent to the second user terminal 102(B), to cause the second user terminal 102(B) to cause these data packets to be sent to the first user terminal 102(A).

A transmission time of each packet is determined based on information received at the first user terminal 102(A) with the packets. A time of reception at the first user terminal 102(A) of each packet is determined using a reception clock at the first user terminal 102(A). The estimation function at the first user terminal 102(A) is supplied with successive sets of observations including in each set a transmission time, a reception time and a packet size. In this embodiment the estimation function is comprised within the CPU 200 of the first user terminal 102(A), but in other embodiments the estimation function may be comprised in a processor which is separate, but connected to, the CPU 200.

The estimation function is arranged to provide an estimate of the downlink bandwidth of the end-to-end connection between the two user terminals using a relationship between the estimated downlink bandwidth, the amount of data in the queue, packet size, and the interval between packet transmissions. Although different specific relationships between these values may be used in alternative embodiments, in this embodiment a specific relationship used by the estimation function is:

$$N(k,i)=\max(N(k-1,i)+CT(k,i)-(Tx(k,i)-Tx(k-1,i)) *BW_{DN}(i),0)+S(k,i)$$

where N(k,i) is the amount of data in the channel packet queue at time Tx(k,i), $BW_{DN}$ is the downlink bandwidth, S(k,i) is the packet size and CT(k,i) denotes any cross-traffic received from nodes other than the transmitter of the data.

In alternative embodiments to that described, the uplink bandwidth is measured at the first user terminal 102(A), by way of the second user terminal 102(B) reporting the time of its reception of packets from the queue to an estimation function at the first user terminal 102(A), which is then able to operate in substantially the same manner as the estimation function described above for estimating the downlink bandwidth at the second user terminal 102(B).

Also, in alternative embodiments to that described, the downlink bandwidth is measured at the second user terminal 102(B), by way of the first user terminal 102(A) reporting the time of its reception of packets from the queue to an estimation function at the second user terminal 102(B), which is then able to operate in substantially the same manner as the estimation function described above for estimating the uplink bandwidth at the first user terminal 102(A). Once the downlink bandwidth has been so measured, the second user terminal 102(B) provides the first user terminal 102(A) with an indication of the downlink bandwidth.

Once the uplink and/or downlink bandwidth(s) of the end-to-end connection has been measured, the client engine 226 causes (step S404) information indicative of an expected quality of a call (were it established between the two user terminals 102(A) and 102(B)) to be displayed on the display 208 of the first user terminal 102(A), in dependence on the measured uplink and/or downlink bandwidth of the end-to-end connection. In this embodiment, the information is displayed as a "score" indicated in the fourth panel 308 of the user interface shown in FIG. 3. The format and content of this "off-call score" will be described in more detail below.

In this embodiment, the score is determined based on a combination of the measured uplink and downlink bandwidths. In alternative embodiments, the score is determined using only one of the uplink and downlink bandwidths. Indeed, in some embodiments, only one of the uplink and downlink bandwidths is measured.

As a result of analysing the displayed score, the user is able to determine whether the indicated expected quality will result in a call, subsequently setup on the end-to-end connection between the first and second user terminals, having a quality which meets the user's expectations. The user is able to select ("yes" at step S405) that an audio call or a video call is to be setup with the second user terminal 102(B) by selecting one of call initiation buttons 307 and 309, respectively, shown in the forth panel 308 of the user interface.

Once the client engine 226 receives an indication of the selection of one of these call initiation buttons 307, 309, the client engine 226 causes initial call parameters to be set (step S406). In this embodiment, when it is determined that an audio call is to be placed, initial audio bandwidth assignments are set, packet size and time interval between audio packets are set, and an initial level of forward error correction to be applied is set, each on the basis of the measured bandwidth(s) of the end-to-end connection. On the other hand, if it were determined that a video call is to be placed, then initial video bandwidth assignments are set, the bite size of video packets are set, and an initial level of forward error correction is also set, each on the basis of the measured bandwidth(s) of the end-to-end connection.

In alternative embodiments, one or more of these initial call parameters may not be set at this stage. Indeed, in some embodiments, no initial call parameters will be set at this stage, and predetermined default call parameters are instead employed.

Next the client engine 226 causes (step S407) the call to be set up with the second user terminal 102(B), via the network interface 202 and the connection between the first user terminal 102(A) and the Internet 108. This may be by any way known in the art, and thus will not be further described herein. Moreover, communication between the two user terminals during the call may also be by methods known in the art and will also not be further described herein. Once it is intended by either of the two participants of the call 102(A) and 102(B) to end the call, the call is ended (step S408), again as may be known in the art.

On the other hand, the user is able to select not to establish the call with the second user terminal by providing an input other than a selection of one of the call initiation buttons 307 and 309 ("no" at step S405), and the user can then decide whether or not to take corrective action in order to improve the estimated call quality. In some instances, the user may decide that they are no longer interested in placing a call with the second user terminal 102(B), and thus they determine that corrective action is not to be taken. The client engine 226 then receives an input to this effect, such as an instruction to break the end-to-end connection ("no" at step 409), and as a result the client engine 226 causes the end-to-end connection between the two user terminals to be broken (step S410).

On the other hand, if it is decided to take corrective action, then the user can use the mouse and/or keyboard 212, 210 in order to provide an input to the client engine 226 indicative of this ("yes" at step S409) to cause system settings at the first user terminal 102(A) to be changed (step S411). In different embodiments, such settings comprise one or more of the following:

Disabling or closing other programs which are running "on" the operating system 220;

Stopping some or all downloads that are being made from the Internet 108;

Stop some or all uploads being made to the Internet 108;

Changing firewall settings;

Changing the amount of CPU resources made available for VoIP communications;

Establishing an alternative means of connecting to the Internet 108; and

Reducing the amount of bandwidth available to other computers connected to the Internet 108 via the same Internet connection.

The user may also take other corrective actions, such as moving the first user terminal closer to a wireless router that they use to connect to the internet, if applicable.

Once some or all of the corrective actions have been made, in this embodiment the bandwidth(s) of the end-to-end connection between the two user terminals 102(A) and 102(B) is measured again using the method described above with reference to step S403 of FIG. 4. Additionally, steps S404 and S405 are repeated. If the client engine 226 receives an input representative of a user's selection of one of the call initiation buttons 307 and 309 to establish a call with the second user terminal 102(B), then steps S406 to S408 are enacted. Alternatively, if the client engine 226 receives an input representative of an action other than a selection of one of the call initiation buttons 307 and 309, then the process returns to step S409.

Since only the first and second user terminals 102(A) and 102(B) and the Internet 108 illustrated in FIG. 1 are involved in the described first embodiment, the other elements illustrated in FIG. 1 (i.e. the other user terminals 102(C), 102(D) and 102(E), the servers 103, 104 and 105, the gateway 106 and PSTN and/or mobile network 109) may, in alternative embodiments, be omitted.

In a variation to this embodiment, measurement of the uplink and downlink bandwidths of the end-to-end connection between the first and second user terminals is repeated at predetermined intervals, such as every 30 seconds. That is, steps S403 and S404 are repeated. As a result, the user of the first user terminal 102(A) is provided with a frequently-updated indication of the estimated quality of a call with the second user terminal 102(B).

Figure 8:
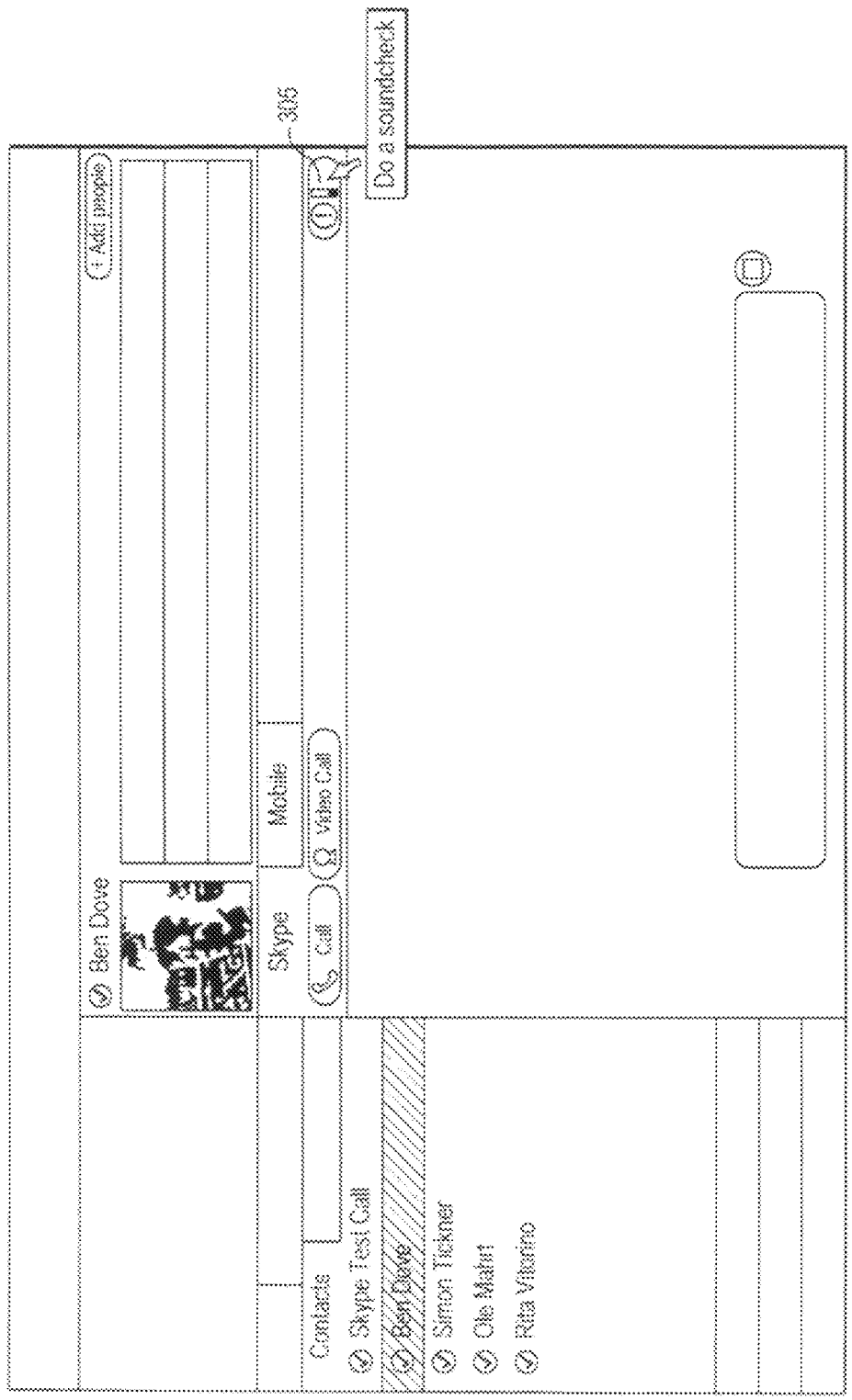
FIG. 8 is a schematic representation of another P2P communications client user interface viewed on a display of a user terminal.

In some embodiments, the measurement of the quality of the end-to-end connection between the first and second user terminals is preformed when requested by a user, such as when the user selects a region on the displayed user interface (such as the combined score 305 shown in FIG. 8 or the "Test network" button 308a in FIG. 3). Once the measurement of the quality has been performed, a notification (such as an audio or visual indication) may be provided to the user to tell them that the measurement has been performed. Thus, the indication of the estimated quality of a call with the second user terminal 102(B) is based on the most-recently performed measurement. Measurement of the quality of the connection may be subsequently repeated at predetermined intervals, and the indication may be correspondingly updated accordingly.

In further embodiments, steps S402 to S404 are performed for a plurality, or all, of the contacts in the contact list. Thus, end-to-end connections are made between the first user terminal 102(A) and each of the contacts, a measurement is made of the quality of each of the respective end-to-end connections, and an indication of estimated call quality relating to calls that could be established via each end-to-end connection is provided to the user of the first user terminal 102(A). Steps S402 to S404 (or only steps S403 and S404) may be repeated to provide the user of the first user terminal 102(A) with frequently-updated indications of the estimated qualities of calls with the plurality of contacts in their contact list. Based on the displayed indications, the user can thus decide which contact to call or have their level of expectation of call quality set prior to placing a call to a contact.

In a variation to the described version of the first embodiment, the first user terminal 102(A) does not form an end-to-end connection with the second user terminal 102(B), but instead forms an end-to-end connection with a node that has a common characteristic with the second user terminal. In the embodiment described immediately below, this node is a server that has a common location with the second user terminal in terms of its proximity to the second user terminal in a network. In other embodiments, the node may be a user terminal that has a common characteristic with the second user terminal, such as a common geographical or network location.

In this variation, after the client engine 226 receives the above-mentioned indication of the user's selection of the button 308a (step S401 in FIG. 4) or indication of the user's selection of the name of the user of the second user terminal 102(B) (the potential callee), the client engine 226 determines an address, identity or location of a server that has a common location with the second user terminal 102(B), such as by comparing the address of the second user terminal with addresses, identities or locations of servers in a list or database. The address of the second user terminal may again be obtained by address look up, by scanning the data that is illustrated in the user interface, or by prompting the user to enter or otherwise indicate the address. The address, identity or location of the server is an example of information relating to the second user terminal, i.e. relating to the potential callee, and by this method the server is selected in dependence on the information relating to the potential callee.

The client engine 266 then causes an end-to-end connection to be made between the first user terminal 102(A) and the server, via the network interface 202 of the first user terminal and thus via a local network connection between the first user terminal 102(A) and access point of the Internet 108 (step 402). It is to be noted that this end-to-end connection again does not comprise a call, since no call data (e.g. audio data or video data) is exchanged over the end-to-end connection.

Once the end-to-end connection between the first user terminal and the server is established, the uplink and/or downlink bandwidth of the end-to-end connection is measured (step 403) by way of any of the bandwidth-measurement methods described herein.

Once the uplink and/or downlink bandwidth(s) of the end-to-end connection has been measured, the client engine 226 causes (step S404) information indicative of an expected quality of a call (were it established between the first user terminal 102(A) and the second user terminal 102(B)) to be displayed on the display 208 of the first user terminal 102(A), in dependence on the measured uplink and/or downlink bandwidth of the end-to-end connection between the first user terminal and the server. Again, this indication may be in the form of a displayed score, determined in any manner described above. Since the server shares a common location with the second user terminal 102(B), the measured uplink and/or downlink bandwidths are substantially representative of uplink and/or downlink bandwidths of an end-to-end connection between the first and second user terminals.

As a result of analysing the displayed score, the user is able to determine whether the indicated expected quality will result in a call, subsequently established between the first and second user terminals, having a quality which meets the user's expectations.

The user is able to select ("yes" at step S405) that an audio call or a video call is to be setup with the second user terminal 102(B) by selecting one of call initiation buttons 307 and 309, respectively, shown in the forth panel 308 of the user interface. Above steps S406 to S408 are then enacted.

On the other hand, the user is able to select not to establish the call with the second user terminal 102(B) by providing an input other than a selection of one of the call initiation buttons 307 and 309 ("no" at step S405). Steps S409 and S410 or S411 are then enacted, substantially as described above, except that in step S409 the instruction is to break the end-to-end connection between the first user terminal and the server, and in step S410 it is that end-to-end connection that is broken. If step S411 is enacted, then steps S403 to S405 of this variation to the first embodiment are repeated.

The second embodiment of the present invention will now be described with reference to FIGS. 1-3 and 5. Again, for the purpose of this description the user terminal 102(A) shown in FIG. 1 will be taken to be the first user terminal, i.e. the potential caller.

In this embodiment, when the user (Joe) of the first user terminal 102(A) wishes to communicate with a user of a second user terminal 102(B), the client engine 226 receives an indication of a selection by the user of the first user terminal 102(A) of the identity of the user of the second user terminal 102(B) in the second panel 304 of the user interface shown in FIG. 3. So, in this case, Joe uses their mouse 212 to select the contact labelled as "Stephen Madeup". As shown in FIG. 3 and discussed above, a profile of the selected contact is then shown in the third panel 306 of the user interface.

Following this selection, if the user of the first user terminal 102(A) wants to obtain indication of an expected quality of a call with the user of the second user terminal 102(B) before the call is setup, they select the button 308a marked "Test network". As a result, the client engine 226 receives an indication of the user's selection of the button (step S501 in FIG. 5) and thus causes (step S502) respective end-to-end connections to be made between the first user terminal 102(A) and each of third to fifth user terminals 102(C), 102(D) and 102(E), via the network interface 202 of the first user terminal 102(A), and thus via the local network connection between the first user terminal 102(A) and its access point of the Internet 108. In some embodiments, one, more, or all of the third through fifth "user terminals" are run on respective servers. It is to be noted again that these end-to-end connections do not comprise calls.

In this embodiment, the third through fifth user terminals are selected at random from a plurality of a greater number of user terminals connected to the Internet 108. In alternative embodiments, end-to-end connections may be established between the first user terminal 102(A) and different ones of the plurality of user terminals (excluding the second user terminal 102(B) that has been selected by the user of the first user terminal as the indented callee), or an end-to-end connection may be made between the first user terminal 102(A) and only one of the other user terminals (excluding the second user terminal 102(B)). In still further embodiments, the user terminal or user terminals with which the first user terminal 102(A) forms an end-to-end connection may be predetermined and not random. In still further embodiments, an end-to-end connection may also be made between the first user terminal 102(A) and the selected second user terminal 102(B).

Once the respective end-to-end connections between the first and other user terminals are established, the client engine 226 causes (step S503) measurements to be made of the uplink and downlink bandwidths of the respective end-to-end connections between the first and other user terminals. In this particular embodiment, each of the respective uplink and downlink bandwidths of the respective end-to-end connections is measured using an estimation function in a manner similar to that described above. Thus, to determine the downlink bandwidths, the estimation function at the first user terminal 102(A) employs the specific relationship:

$$N(k,i)=\max(N(k-1,i)+CT(k,i)-(Tx(k,i)-Tx(k-1,i))*BW_{DN}(i),0)+S(k,i)$$

where $N(k,i)$ is the amount of data in the channel packet queue at time $Tx(k,i)$, $BW_{DN}$ is the downlink bandwidth, $S(k,i)$ is the packet size and $CT(k,i)$ denotes any cross-traffic received from nodes other than the transmitter of the data and, to measure the uplink bandwidths, estimation functions at each of the other user terminals employ the specific relationship:

$$N(k,i)=\max(N(k-1,i)+CT(k,i)-(Tx(k,i)-Tx(k-1,i))*BW_{UP}(i),0)+S(k,i)$$

where $N(k,i)$ is the amount of data in the channel packet queue at time $Tx(k,i)$, $BW_{UP}$ is the respective uplink bandwidth, $S(k,i)$ is the packet size and $CT(k,i)$ denotes any cross-traffic from the transmitter of the data.

Each of the alternative and/or optional features or locations of estimation functions discussed above with reference to the first embodiment are equally applicable to this second embodiment. For example, the respective downlink bandwidths of the end-to-end connections may be measured by respective estimation functions at the other user terminals, and the respective uplink bandwidths of the end-to-end connections may be measured by an estimation function at the first user terminal 102(A).

Again, in this embodiment the data comprised in the packets sent to the respective other user terminals is data that is randomly generated at the first user terminal 102(A), but in alternative embodiments the data may be predetermined and of fixed content. In some embodiments the data conveys information, such as avatar updates.

Once the respective uplink and downlink bandwidths of the respective end-to-end connections have been measured, the client engine 226 causes (step S504a) an estimation of the uplink and downlink bandwidths of the local network connection between the first user terminal 102(A) and the Internet 108 to be made using the measured bandwidths of the respective end-to-end connections. This is preferably carried out by aggregation of the multiple end-to-end measurements. For example, if all the end-to-end measurements indicate low uplink connection qualities, it can be estimated that the quality of the local network uplink connection is low. If all the end-to-end measurements indicate high downlink connection qualities, it can be estimated that the quality of the local network downlink connection is high. If some of the end-to-end measurements indicate low uplink connection quality and some indicate high uplink connection quality, it can be estimated that the quality of the local network uplink connection is good or average, since the low measurements were likely due to problem(s) that are not on the local network connection of the first user terminal 102(A). In alternative embodiments, the uplink and downlink bandwidths of the local network connection may be estimated as being equal to the largest measured uplink and downlink bandwidths of the respective end-to-end connections.

Once the uplink and downlink bandwidths of the local network connection have been estimated, information indicative of an expected quality of a call in which the first user terminal will comprise an end point is displayed on the display 208 (step S504b) of the first user terminal 102(A). This displaying of information can therefore be considered to be in dependence on the measured uplink and/or downlink bandwidths of the end-to-end connections. In this embodiment, the information is again displayed as a "score" in the fourth panel 308 of the user interface shown in FIG. 3. The format and content of this "off-call score" will be described in more detail below, but in general the score provides an indication of an estimated quality of a call, should it be placed via the local network connection.

In this embodiment, the score is determined based on a combination of the measured uplink and downlink bandwidths. In alternative embodiments, the score is determined using only one of the uplink and downlink bandwidths. In some embodiments, only one of the uplink and downlink bandwidths of the local network connection is estimated and only one of the uplink and downlink bandwidths of the end-to-end connections are measured.

As a result of analysing the displayed score, the user is able to determine whether the indicated expected quality will result in a call, subsequently set up via the local network connection with the first user terminal as an end point, having a quality which meets the user's expectations.

The user is able to select ("yes" at step S505) that an audio or video call is to be set up with the second user terminal 102(B) by selecting one of the call initiation buttons 307 and 309, respectively, shown in the forth panel 308 of the user interface of FIG. 3, substantially as described above. Steps S506 to S508 are then substantially the same as steps S406 to S408 described above.

Alternatively, the user is able to select not to establish a call with another user terminal by providing an input other than a selection of one of the call initiation buttons 307 and 309 ("no" at step S505) and the process continues to step S509. Steps S509 to S511 are then substantially the same as steps S409 to S411, respectively, the only difference is being that in step S510, one or more (or all) of the end-to-end connections between the first user terminal 102(A) and the other user terminal(s) (which may not comprise the selected second user terminal) are broken. After step S511 the process returns to step S503, in which the respective uplink and downlink bandwidths of the respective end-to-end connections between the first user terminal and the other user terminals are again measured. Moreover, as a result of the repeat of step S503, steps S504a, S504a and S505 are also reiterated.

In alternative embodiments, the quality of the respective end-to-end connections between the first user terminal and the other user terminal(s) may be measured as a result of the user indicating their selection of the second user terminal as a potential callee. In some embodiments, the qualities of the connections are measured at predetermined intervals, either as a result of the user's selecting an intended callee or, in alternative embodiments, independently of the user's selection of an intended callee.

In some embodiments, the quality of an end-to-end connection between the first user terminal and one or more of the other user terminals may be tested each time a selection of a contact as an intended callee is made, or changes. In some embodiments, the end-to-end connection between the first user terminal and one of the other user terminals which has the best quality out of the plurality of end-to-end connections between the first user terminal and the other user terminal(s) may be determined and, in some embodiments, displayed on the display 208.

Given that the servers 103, 104 and 105, the gateway 106 and the PSTN and/or mobile network 109 (all illustrated in FIG. 1) are not necessarily employed in this embodiment of the invention, one or more of these elements may be omitted from the system illustrated in FIG. 1.

In a variation to this embodiment, measurement of the uplink and downlink bandwidths of the end-to-end connection(s) between the first and other user terminal(s) is repeated at predetermined intervals, e.g. of 30 seconds or less. That is, steps S503, S504a and S504b are repeated. As a result, the user of the first user terminal 102(A) is provided with a frequently-updated indication of the expected quality of a call, should it be established over the local network connection between the first user terminal 102(A) and the Internet 108.

The third embodiment of the present invention will now be described in greater detail with reference to FIGS. 1-3 and 6. Again, for the purpose of this description, the user terminal 102(A) shown in FIG. 1 will be taken to be the first user terminal, i.e. the potential caller.

In this embodiment, when the user (Joe) of the first user terminal 102(A) wishes to communicate with a user of a second user terminal 102(B), the client engine 226 receives an indication of a selection by the user of the first user terminal 102(A) of the identity of the user of the second user terminal 120(B) in the second panel 304 of the user interface shown in FIG. 3. So, the user uses their mouse 212 to select the contact labelled as "Stephen Madeup". A profile of the selected contact is then shown in the third panel 306 of the user interface, as described above.

Following this selection, if the user of the first user terminal 102(A) wants to obtain an indication of an expected quality of a call with the user of the second user terminal 102(B) before the call is setup, they select the button 308a marked "Test network". As a result, the client engine 226 receives an indication of the user's selection of the button (step S601 in FIG. 6) and thus the client engine 226 of the first user terminal 102(A) causes an end-to-end connection to be made between the first user terminal 102(A) and a server 103, via the network interface 202 of the first user terminal 102(A) and thus via the local network connection between the first user terminal 102(A) and its access point to the Internet 108. This is shown as step S602 in FIG. 6. A session is then set up between the first user terminal 102(A) and the server 103, in a manner as may be known in the art. Neither the end-to-end connection nor the session comprises a call, since no call data (e.g. audio data or video data) is exchanged.

Once the connection and session between the first user terminal 102(A) and the server 103 have been established, the client engine 226 causes (step S603) the uplink and downlink bandwidths of the end-to-end connection between the first user terminal and the server 103 to be measured. In this particular embodiment, each of the respective bandwidths of the end-to-end connection is measured using an estimation function in a manner similar to that described above. Thus, to measure the downlink bandwidth, the estimation function at the first user terminal 102(A) employs the specific relationship:

$$N(k,i)=\max(N(k-1,i)+CT(k,i)-(Tx(k,i)-Tx(k-1,i))\\ *BW_{DN}(i),0)+S(k,i)$$

where N(k,i) is the amount of data in the channel packet queue at time Tx(k,i), $BW_{DN}$ is the downlink bandwidth, S(k,i) is the packet size and CT(k,i) denotes any cross-traffic received from nodes other than the transmitter of the data and, to measure the uplink bandwidths, an estimation function at the server 103 employs the specific relationship:

$$N(k,i)=\max(N(k-1,i)+CT(k,i)-(Tx(k,i)-Tx(k-1,i))\\ *BW_{UP}(i),0)+S(k,i)$$

where N(k,i) is the amount of data in the channel packet queue at time Tx(k,i), $BW_{UP}$ is the respective uplink bandwidth, S(k,i) is the packet size and CT(k,i) denotes any cross-traffic from the transmitter of the data.

Each of the alternative and/or optional features or locations of estimation functions discussed above with reference to the first embodiment are equally applicable to this third embodiment. For example, the downlink bandwidth of the end-to-end connection may be measured by an estimation function at the server, and the uplink bandwidth of the end-to-end connection may be measured by an estimation function at the first user terminal 102(A).

In this embodiment, the data comprised in the sent packets is data that is randomly generated, but in alternative embodiments the data may be predetermined and of fixed content. In some embodiments the data conveys information, such as avatar updates.

Once the uplink and downlink bandwidths of the end-to-end connection have been measured, the client engine 226 causes an estimation of the uplink and downlink bandwidths of the local network connection between the first user terminal 102(A) and the Internet 108 to be made using the measured bandwidths of the end-to-end connection. It can be assumed that there are no bottlenecks in the end-to-end connection, other than any bottleneck in the local connection between the first user terminal 102(A) and the Internet 108. As such, the measurements of the uplink and downlink bandwidths of the end-to-end connection can, in some embodiments, be considered an estimation of the uplink and downlink bandwidths of the first user terminal's local connection to the interne 108.

Once the uplink and downlink bandwidths of the local network connection have been estimated, the client engine 226 causes (step S604) information indicative of an expected quality of a call in which the first user terminal will comprise an end point to be displayed on the display 208 of the first user terminal 102(A). This displaying of information can therefore be considered to be in dependence on the measured uplink and/or downlink bandwidths of the end-to-end connection. In this embodiment, as above, the information is displayed as a "score" shown in the fourth panel 308 of the user interface shown in FIG. 3. The format and content of this "off-call score" will be described in more detail below, but in general the score provides an indication of an estimated quality of a call, should a call be subsequently placed via the local network connection.

In this embodiment, the score is determined based on a combination of measured uplink and downlink bandwidths. In alternative embodiments, the score is determined using only one of the uplink and downlink bandwidths. In some embodiments, only one of the uplink and downlink bandwidths of the local network connection is estimated and only one of the uplink and downlink bandwidths of the end-to-end connections are measured.

As a result of analysing the displayed score, the user is able to determine whether the indicated expected quality will result in a call, subsequently set up via the local network connection with the first user terminal as an end point, having a quality which meets the user's expectations.

The user is able to select ("yes" at step S605) that an audio or video call is to be setup with the second user terminal 102(B) by selecting one of the call initiation buttons 307 and 309, respectively, shown in the forth panel 308 of the user interface of FIG. 3, substantially as described above. Steps S606 to S608 are then substantially the same as steps S406 to S408 described above.

Alternatively, the user is able to select not to establish a call with another user terminal by providing an input other than a selection of one of the call initiation buttons 307 and 309 ("no" at step S605) and the process continues to step S609. Steps S609 to S611 are substantially the same as steps S409 to S411 of FIG. 4 discussed above, with the difference that the connection broken in step S610 is the end-to-end connection between the first user terminal 102(A) and the server 103. After step S611, steps S603 to S605 are repeated, and the user of the first user terminal 102(A) then again determines whether the revised indicated expected call quality will result in a call placed via the local network connection between the first user terminal and the Internet 108 having a quality which meets their expectations.

This embodiment of the present invention may be modified in such a way that end-to-end connections and associated sessions are set up between the first user terminal 102(A) and a plurality of servers 103, 105 connected to the Internet 108. In other words, there may be more than one end-to-end connection that is assessed. In such a scenario, step S604 is modified such as to comprise step S604a, in which the client engine 226 causes the uplink and downlink bandwidths of the local network connection between the first user terminal and the Internet to be estimated based on respective measured uplink and downlink bandwidths of respective end-to-end connections between the first user terminal and the servers 103, 105, and to also comprise step S604b in which information indicative of an expected quality of a call in which the first user terminal will comprise an end point is displayed on the display 208 of the first user terminal 102(A). This displaying of information can be considered to be in dependence on the measured uplink and/or downlink bandwidths of the end-to-end connections.

This estimation is preferably carried out by aggregation of the multiple end-to-end measurements. For example, if all the end-to-end measurements indicate low uplink connection qualities, it can be estimated that the quality of the local network uplink connection is low. If all the end-to-end measurements indicate high downlink connection qualities, it can be estimated that the quality of the local network downlink connection is high. If some of the end-to-end measurements indicate low uplink connection quality and some indicate high uplink connection quality, it can be estimated that the quality of the local network uplink connection is good or average, since the low measurements were likely due to problem(s) that are not on the local network connection of the first user terminal 102(A). In alternative embodiments, the uplink and downlink bandwidths of the local network connection may be estimated as being equal to the largest measured uplink and downlink bandwidths of the respective end-to-end connections.

In this described third embodiment, the end-to-end connection and session are set up between the first user terminal 102(A) and the server 103 as a result of a "Test network" button 308a selection being made. In alternative embodiments, the end-to-end connection and session are set up with the server 103 at predetermined intervals. In still further embodiments, the end-to-end connection and session between the first user terminal 102(A) and the server 103 are set up whenever the user of the first user terminal 102(A) selects a desired callee. In still further embodiments, the end-to-end connection and session between the first user terminal 102(A) and the server 103 is a permanent connection and a permanent session, respectively, i.e. they last for the duration that the first user terminal 102(A) is logged onto the Internet 108.

In the third embodiment of the invention, the measurement of the bandwidths of the end-to-end connection between the first user terminal 102(A) and the server 103 may be made plural times and at predetermined intervals of e.g. 30 seconds. In some alternative embodiments, the measurements are only made when a selection of a contact as a desired callee is made or changed by the user of the first user terminal 102(A).

Since in this third embodiment, and some variations thereof, the user terminals 102(C), 102(D) and 102(E) illustrated in FIG. 1 are not employed, those elements may be omitted from the system illustrated in FIG. 1. Similarly, since the PTP server 104, gateway 106, and PSTN and/or mobile network 109 are not employed, one or more of these elements may also be omitted.

In a variation to this embodiment, measurements of the uplink and downlink bandwidths of the end-to-end connection(s) between the first user terminal 102(A) and the server(s) are repeated at predetermined intervals. That is, steps S603 and S604, or steps S603, S604a and S604b are repeated. As a result, the user of the first user terminal 102(A) is provided with a frequently-updated indication of an expected call quality, should the call be established over of the local network connection between the first user terminal 102(A) and the Internet 108.

The fourth embodiment of the present invention will now be described with reference to FIGS. 1-3 and 7. Again, for the purpose of this description the user terminal 102(A) shown in FIG. 1 will be taken to be the first user terminal, i.e. the potential caller.

In this embodiment, the client engines of a plurality of respective user terminals 102 connected to the Internet 108 (and in some embodiments all of these user terminals 102) cause (step S701 in FIG. 7) respective end-to-end connections with the server 103 (via respective local network connections between the user terminals associated with the client engines and the Internet 108) to be established. Having formed such end-to-end connections with the server 103, each client engine causes (step S702) the uplink and downlink bandwidths of the end-to-end connection between their associated user terminal and the server 103 to be measured (in a manner which may be substantially as described above for any one of the preceding embodiments), and estimates of the uplink and downlink bandwidths of the local network connection between the associated user terminal and the Internet 108 may be obtained (again, in a manner which may be substantially as described above for any one of the preceding embodiments).

The client engine 226 of the first user terminal 102(A) then causes (step S703) the measured uplink and downlink bandwidths of the end-to-end connection to be sent as performance measurements to each of the other user terminals 102 connected via the Internet 108 into the communication system. Similarly, each of the other user terminals 102 sends their locally determined uplink and downlink bandwidths of their end-to-end connections as performance measurements to each of the other user terminals 102 connected to the Internet 108 in the communication system. Thus the client engine 226 of the first user terminal 102(A) receives (step S704) performance measurements from each of the other user terminals 102 connected into the communication system. The performance measurements may alternatively comprise some other information indicative of the quality of the end-to-end connections between the respective user terminals and the server 103.

In a variation to this fourth embodiment, the sent performance measurements may additionally or alternatively comprise information indicative of the estimated quality of the local network connection by which the first user terminal 102(A) is connected to the internet 108, such as estimated uplink and/or downlink bandwidth information. Similarly, the received performance measurements may additionally or alternatively comprise information indicative of the estimated quality of the local network connections by which the other user terminals 102 are connected to the internet 108 or to their respective local networks, such as estimated uplink and/or downlink bandwidth information.

(It is to be noted that such exchange of performance measurements may also be carried out in a variation to the first or second embodiments discussed above. In such cases, the performance measurements sent from any user terminal to other user terminal(s) may comprise information indicative of the quality of an end-to-end connection between the user terminal and at least one other user terminal, and/or information indicative of the quality of an end-to-end connection between the user terminal and at least one other server, and/or information indicative of the estimated quality of the local network connection by which the user terminal is connected to the internet or its local network).

The client engine 226 of the first user terminal then causes (step S705) information indicative of an expected quality of a call (were it to be established with the first user terminal and a second one of the other user terminals 102(B) as end points) to be displayed on the display 208 of the first user terminal 102(A), in dependence on one, some or all of: a) the measured uplink and/or downlink bandwidth of the end-to-end connection between the first user terminal 102(A) and the server 103, b) the measured uplink and/or downlink bandwidth of the end-to-end connection between the second user terminal 102(B) and the server 103, c) the estimated uplink and/or downlink bandwidth of the local network connection by which the first user terminal 102(A) is connected to the internet 108, and d) the estimated uplink and/or downlink bandwidth of the local network connection by which the second user terminal 102(B) is connected to the internet 108 or its local network.

In a similar manner to that discussed above and below, this information may be displayed as an "off-call-score". In this embodiment, the off-call score is determined based on a combination of measured uplink and downlink bandwidths. In alternative embodiments, the score is determined using only one of the uplink and downlink bandwidths. In some embodiments, only one of the uplink and downlink bandwidths of one or both of the end-to-end connections is measured. In alternative embodiments, the score is determined based on one or both of a) the estimated uplink and/or downlink bandwidths of the first user terminal's local network connection, and b) the estimated uplink and/or downlink bandwidths of the second user terminal's local network connection.

As a result of analysing the displayed score, the user is able to determine whether the indicated expected quality will result in a call, subsequently set up via the local network connection with the first and second user terminals as end points, having a quality which meets the user's expectations.

In some embodiments, information indicative of expected qualities of calls between the first user terminal and a plurality or all of the other user terminals is displayed on the display 208. This may be on the basis of the measured uplink and/or downlink bandwidth of the end-to-end connection between the first user terminal 102(A) and the server 103 and on the basis of the measured uplink and/or downlink bandwidths of the respective end-to-end connections between the respective other user terminals 102 and the server 103.

In some embodiments, an indication of the quality of the local network connection of the first user terminal, and/or indications of the quality of the respective local network connections of the other user terminals, is displayed. In that case, each of the indications is displayed as a "score" in the user interface. Again, the format and content of these "off-call-scores" will be described in more detail below.

If it is decided to take corrective action(s) to try to improve the expected quality of calls in which the first user terminal would be an end point, then the user can use the mouse and/or keyboard 212, 210 in order to provide an input to the client engine 226 indicative of this ("yes" at step S706) to cause system settings at the first user terminal 102(A), and/or settings relating to their local network connection, to be changed (step S707). Following these changes the client engine 226 of the first user terminal 102(A) causes the bandwidths of the end-to-end connection between the first user terminal 102(A) and the server 103 to be measured again in a repeated step S702, and steps S703 to S705 are reiterated.

If the user is happy with the indicated expected call quality for a call between the first user terminal 102(A) and the second user terminal 102(B), the user is able to select the second user terminal 102(B) as an intended contact to establish a call with and to then select ("yes" at step S708) that an audio or video call is to be setup with the second user terminal 102(B) by selecting one of the call initiation buttons 307 and 309, respectively, shown in the forth panel 308 of the user interface of FIG. 3, substantially as described above. Steps S710 to S712 are then substantially the same as steps S406 to S408 described above.

Alternatively, the user is able to select not to establish a call with another user terminal by providing an input other than a selection of one of the call initiation buttons 307 and 309 and other than a selection of an intended callee ("no" at step S708) and the process continues to step S709 at which the client engine 226 causes the end-to-end connection between the first user terminal 102(A) and the server 103 to be broken.

In an alternative embodiment, at steps S703 and S704 respectively, the first user terminal 102(A) only sends performance measurements to a selected contact and only receives performance measurements from the selected contact. As a result, the information displayed at step S705 relates to an end-to-end connection between the first user terminal and the selected user terminal. Optionally, the displayed information relates also or alternatively to the local network connection between the first user terminal 102(A) and the Internet 108 and/or the local network connection between the selected user terminal 102(B) and the Internet 108 or its local network.

In an alternative embodiment, at steps S703 and S704 respectively, the first user terminal 102(A) only sends performance measurements to contacts included in the contact list of the first user terminal 102(A) and only receives performance measurements from such contacts. As a result, the information displayed at step S705 relates to end-to-end connections between the first user terminal and the contacts in the contact list. Optionally, the displayed information relates also or alternatively to the local network connection between the first user terminal 102(A) and the Internet 108 and/or the local network connections between the contacts in the list and the Internet 108 or their respective local network(s).

In each discussed variant of this fourth embodiment, the sending and receiving of performance measurements is carried out at an instance which is not dependent on the user's selection of an intended callee. In some variants of this fourth embodiment, the sending and receiving of performance measurements is carried out as a result of the user of the first user terminal 102(A) indicating a selection of a potential callee.

In some embodiments, the qualities of the end-to-end connections may be measured at predetermined intervals, either as a result of the user's selecting an intended callee or, in alternative embodiments, independently of the user's selection of an intended callee.

Given that the server 105, the P2P server 104, the gateway 106, and the PSTN and/or mobile network 109 (all illustrated in FIG. 1) are not necessarily employed in this embodiment of the invention, one or more of these elements may be omitted from the system illustrated in FIG. 1 for the purpose of this embodiment.

In a variation to this fourth embodiment, measurement of the uplink and downlink bandwidths of the end-to-end connection between the first user terminal 102(A) and the server is repeated at predetermined intervals of e.g. 30 seconds. The performance measurements may be shared at predetermined intervals. As a result, the user of the first user terminal 102(A) is provided with a frequently-updated indication of the estimated quality of a call between the first user terminal 102(A) and at least one other user terminal 102.

"Off call scores" are mentioned several times above. In some embodiments, once a call is placed between the first user terminal and another user terminal, the uplink and downlink bandwidths (or other quality characteristic(s)) of the end-to-end connection over which the call is made are also determined during the call. On the basis of these determined bandwidths (or other quality characteristic(s)) during the call, an indicator in the form of an "on call score" is determined.

In preferred embodiments, the off-call score and on-call score take the form of icons displayed on the display 208, with different appearances of the icons indicating different call qualities, and thus different scores. For example, a red icon may indicate a very-low call quality, an orange icon may indicate poor call quality, a yellow icon may indicate low call quality, a yellow-green icon may indicate good or medium call quality, and a green icon may indicate very good or high call quality.

In some embodiments, the respective icons indicating different call qualities may each be of a different shape or size. For example, the respective icons may comprise "bars" of different lengths selected from a sliding scale, from a full-height or full-length bar indicating high quality to a lowest-height or lowest-length bar indicating very-low quality.

In other embodiments, the scores may comprise a number on a scale of 1 to 5, with 1 indicating very-low call quality, 2 indicating poor call quality, 3 indicating low call quality, 4 indicating good or medium call quality, and 5 indicating very good or high call quality.

An indication may also be given if it is not possible to provide an indication of the quality of a call, e.g. because either a connection has been broken or the method for measuring or estimating connection quality has failed.

In some embodiments, the "on call score" is indicated on the display 208 of the first user terminal for the user's information. In some embodiments, the uplink and downlink bandwidths of the end-to-end connection of the call are determined plural times, such as at predetermined intervals (of e.g. 30 seconds), and the displayed on call score updated accordingly based on the latest determined bandwidths. As such, the user of the first user terminal is provided with an indication of the quality of the connection they are using.

If the on call score indicates that the end-to-end connection is of low quality, this sets the user's expectations of the continued quality of the call to a low level. Thus, the user is not surprised when e.g. data packets are lost during the call. Furthermore, if the connection is indicated to be of low quality, or of increasingly-low quality over time, the user may decide to end the call before data starts becoming lost. This enables the user to avoid participation in lossy calls, thus improving their overall perception of the communication system.

Either, or both, of the "on call score" and "off call score" are, in some embodiments, accompanied by a displayed explanatory message. Thus, whilst a score itself may be indicated by e.g. a number, by the colour of an icon, or by the length of a bar, the accompanying message provides further information to the user. The further information may be an explanation of what the score represents, and/or suggestions or instructions for corrective action that could be taken by the user to improve one or both of the scores, and/or an explanation of what services (such as audio calls, low quality video calls, and high quality video calls) it should be possible to run between the user's user terminal and another user terminal. Different messages may be displayed before a call is established, when compared to messages that may be displayed during a call.

Table 1 included in the enclosed Appendix illustrates the scores and messages that may be displayed before a call is placed and during a call. Different states are represented by different rows of the table. The first column of Table 1 explains the context in which a score and/or a message is displayed. The second column illustrates the off-call score that would be indicated to a user during that context. The third column illustrates the on-call score that would be indicated to a user during that context. The fourth column illustrates the off-call message that would be displayed to a user during that context. The fifth column illustrates the on-call message that would be displayed to a user during that context.

Although Table 1 indicates scores comprising numbers on a scale of 1 to 5, it will be understood by the reader that the score(s) actually indicated to a user could alternatively or additionally comprise icons of certain colours, forms, shapes or sizes, as discussed above.

So, taking the third row of Table 1 as an example, the expected call quality with a second user terminal is very low such that it is expected that an audio call cannot be supported with the second user terminal. Before it is attempted to establish a call with the second user terminal, the off-call score of "1" is indicated (by means of a displayed red-coloured icon) and the message shown in the fourth column is displayed. If, during a call with the second user terminal, the bandwidth of the end-to-end connection drops to this very low state, then the on-call score of "1" is indicated (again by means of a displayed red-coloured icon) and the message shown in the fifth column is displayed. Thus, when the user notices that the quality of a call is bad, they are provided with a relative indication of the quality of the call (in the form of the on-call score) and also an explanation as to why the call is lossy and suggestions as to how the call quality could be improved by the user.

As shown in the fourth row of Table 1, the message accompanying an indicated score can include a hyperlink which, when selected, causes a further explanation as to how call quality can be improved to be displayed. A link to a page with alternative information may also be included in a message.

In addition to displaying one or both of an "on call score" and an "off call score" that represents the expected bandwidth (or other measurement of quality) of a call, in some embodiments one or both of an "on call score" and an "off call score" is also displayed to represent the available resources of the first user terminal itself, or of one or more of its components. For example, a score can be displayed to illustrate the condition of one or more of:

i) a sound card of the user terminal,
ii) a microphone,
iii) one or more speakers,
iv) a webcam,
v) other peripheral devices connected to the user terminal,
vi) a processor (such as CPU 200) of the user terminal, and
vii) a power source of the user terminal.

Either or both of the "on call score" and "off call score" relating to available resources of the first user terminal itself, or of one or more of its components are, in some embodiments, accompanied by a displayed explanatory message. Thus, whilst a score itself may be a coloured icon, the accompanying message provides further information to the user. The further information may be an explanation of what the score represents, and/or suggestions or instructions for corrective action that could be taken by the user to improve one or both of the scores, and/or an explanation of what services (such as audio calls, low quality video calls, and high quality video calls) it should be possible to establish with the current available resources. For a particular level of resource availability, different messages may be displayed before a call is established with a second user terminal, when compared to message that may be displayed during a call with the second user terminal.

Table 2 included in the enclosed Appendix illustrates the scores and messages relating to available resources of the first user terminal itself, or of one or more of its components, that may be displayed before a call is placed and during a call. Different states are represented by different rows of the table. The first populated column of Table 2 explains the context in which a score and/or a message is displayed. The second populated column illustrates the off-call score that would be indicated to a user during that context. The third populated column illustrates the on-call score that would be indicated to a user during that context. The fourth populated column illustrates the off-call message that would be displayed to a user during that context. The fifth populated column illustrates the on-call message that would be displayed to a user during that context.

So, taking the first row of Table 2 as an example, a sound card of the user terminal cannot be identified by the CPU 200. Before it is attempted to establish a call, the off-call score of "1" is indicated (by means of a displayed red-coloured icon) and the message shown in the fourth column is displayed. If, during a call, the sound card of the user terminal stops functioning or becomes disconnected, then the on-call score of "1" is indicated (again by means of a displayed red-coloured icon) and the message shown in the fifth column is displayed. Thus, when the user notices that the ability to send and receive audio data is lost during a call, they are provided with an associated indication of the available resource (the microphone and associated sound card) in the form of the on-call score, and also an explanation as to why this ability has been lost and suggestions as to how the ability could be regained by the user.

As shown in the first row of Table 2, the message accompanying an indicated score can include a hyperlink which, when selected, causes a further explanation as to how call quality can be improved to be displayed. A link to a page with alternative information may also be included in a message.

It will be noted in Table 2 that on-call and off-call scores and messages are, in some embodiments, provided independently for each of a microphone, speakers, webcam and CPU (and optionally further components). Thus, in some embodiments, in addition to an on-call or off-call score relating to connection quality, respective scores and messages may also be provided for each of the microphone, speakers, webcam and CPU of the user terminal. As such, when call quality is below a user's expectations of the communication system or user terminal, the user is quickly able to determine from the plurality of indicated scores where the cause(s) of the low call quality lies.

So, for example, if a connection quality on-call score of 3 is indicated (by means of a yellow-coloured icon), along with an on-call score of 2 (an orange icon) associated with the CPU and on-call scores of 5 (i.e. respective green icons) for each of the webcam, microphone and speakers, the user can quickly determine that the causes of the low call quality are one or both of the connection quality and resources available at the CPU for the call.

In some embodiments, only the on-call and/or off-call score(s) are indicated, and the accompanying message(s) are hidden. In some such embodiments, when the user of the user terminal uses their mouse 212 to hover a cursor displayed on the screen over a particular indicated score, then a message accompanying the displayed score is then also displayed on the display 208. As such, messages are initially hidden in order to reduce clutter on the display 208.

In some embodiments either or both of the on-call and off-call scores associated with the connection quality may be combined with the other scores relating to the available resources of the user terminal itself, or one or more of its components, to provide a "combined score" that is an indication of an overall call quality estimate. In some embodiments the combined score is indicated to a user, for example by means of one or more of an icon of a certain colour, form, shape or size, as discussed above. The combined score may e.g. be an average (i.e. one of a mode, median and mean) of all available scores relating to available resources and a score relating to connection quality, or equal to the lowest score of all the available scores.

In some embodiments, only the combined score is initially indicated on the display, and the individual scores relating to available resources and the score relating to connection quality (and the accompanying message(s)) are hidden. In some such embodiments, when the user of the user terminal uses their mouse 212 to hover a cursor displayed on the screen over the indicated combined score, then a general message accompanying the indicated combined score is then also displayed on the display 208. As such, the general message is initially hidden in order to reduce clutter on the display 208. Such a general message may give a summary of the overall estimated call quality, based both on the resources available at the user terminal and on the expected quality of the call due to connection quality.

In some embodiments the user is able to instruct the user terminal to indicate the individual scores from which the displayed combined score is calculated, such as by clicking on the combined score. Following receipt of such an instruction, the CPU 200 causes the display 208 to display an indication of the individual scores. In some such embodiments, when the user of the user terminal uses their mouse 212 to hover a cursor displayed on the screen over a particular one of the individual indicated scores, then a message accompanying the individual indicated score is then also displayed on the display 208.

FIG. 8 is a schematic representation of a user interface viewed on a display of a user terminal that is similar to the user interface shown in FIG. 3. The user interface is divided into a number of panels, including panels corresponding to the second through fourth panels of the user interface shown in FIG. 3. In the panel corresponding to the fourth panel a combined score 305 is indicated. The combined score 305 in this embodiment comprises a bar, similar to that by which network coverage is represented on a screen of a mobile phone, and an icon of a certain selected colour, as discussed above. In other embodiments the combined score could comprise a numerical indicator or an indicator of any other suitable form.

Figure 9:
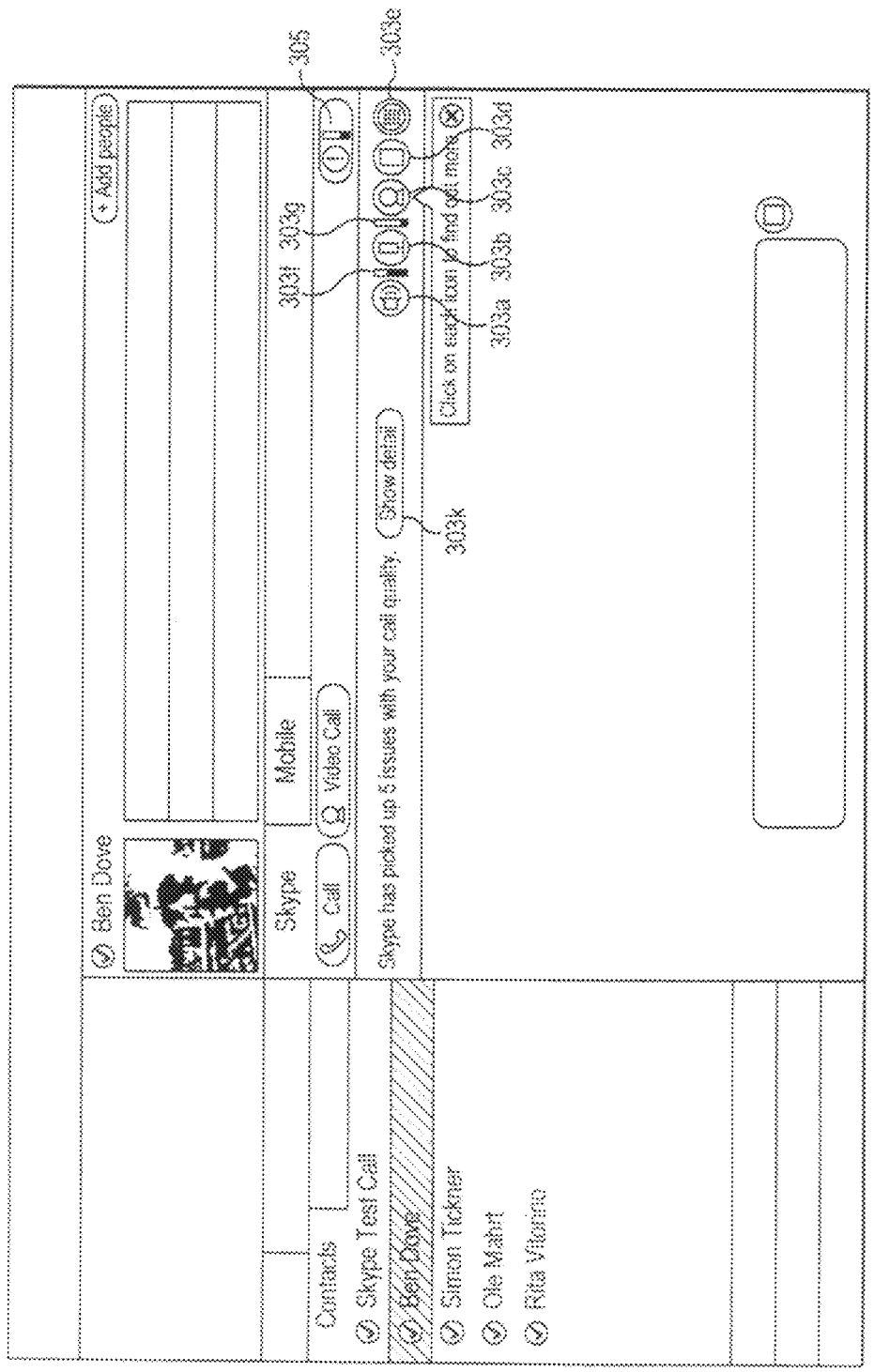
FIG. 9 is a schematic representation of a further P2P communications client user interface viewed on a display of a user terminal.

In FIG. 8 the user has used their mouse 212 to hover over the combined score 305, and a general message is displayed as a result. In this case the general message suggests that the user should "do a soundcheck", i.e. check the levels of one or both of a microphone and speakers of the user terminal. If the user requires more information, i.e. a "breakdown" of the combined score 305, they can use their mouse 212 to select the combined score 305. As a result the user interface shown in FIG. 9 is displayed on the display 208, in which icons 303*a*-303*d*, indicative of respective individual scores from which the indicated combined score 305 is calculated, are shown. In some embodiments, such as that illustrated by FIG. 9, the combined score 305 is displayed simultaneously to the icons 303*a*-303*d*.

The icons 303*a*-303*d* shown in FIG. 9 have appearances which illustrate what (i.e. a particular resource, or the connection quality) the associated individual scores represent. Thus the icon 303*b* comprising an image of a microphone indicates that the score indicated by the icon 303*b* represents the state of the microphone of the user terminal. When the user causes the cursor to hover over one of the individual icons by appropriate operation of the mouse 212, a message (such as one of the messages shown in Table 2) associated with that individual score is displayed. Prior to such hovering, the message is hidden and, in some embodiments, an alternative message instructing the user to "click on each icon to find out more" detail is displayed, as shown in FIG. 9. This alternative message may only be displayed the first time a user views or uses the connection quality test. In other embodiments, messages associated with all the individual scores may be shown simultaneously in the user interface shown in FIG. 9.

In the illustrated embodiment, bars 303*f* and 303*g* are shown adjacent associated icons 303*a* and 303*b* as soon as the screen shown in FIG. 9 is displayed, in order to provide a further indication of the associated scores.

In the embodiment illustrated in FIG. 9, when the user selects the button 303k labelled "Show detail", then all the individual icons 303a-303d are displayed. Prior to that selection, one or some of the icons 303a-303d are hidden. In other embodiments, all of the individual icons 303a-303d are displayed as soon as the user selects the combined score 305 shown in FIG. 8.

In the description above, it is mentioned that in some embodiments the "Test network" button may not be comprised in the location shown in FIG. 3. Indeed, in some embodiments the "Test network" button is displayed and selectable on the user interface when button 303e in FIG. 9 is selected.

Although in the above-described embodiments estimation functions using the specific relationships described above are used in order to estimate the uplink and downlink bandwidths of an end-to-end connection, in alternative embodiments the bandwidths (and/or an alternative quality characteristic of the connection) may be determined using any other known method of estimating the bandwidths of a connection.

For example, in some embodiments round-trip time (RTT) is calculated as an indication of end-to-end connection quality. Calculation of round-trip time and its interpretation as an indicator of end-to-end connection quality are known in the art, and so will not be further described herein.

In other embodiments, a "max throughput" method is employed in which an end-to-end connection is loaded with data until increased one-way delay, packet round-trip time RTT, and/or loss is observed. The bandwidth of the end-to-end connection is then the maximum load that goes through without problems.

In other embodiments a "relative delay" method is used, in which packets of different sizes are sent from the first user terminal to the node and their individual RTTs/delays are measured. Assuming that one-way transmission times equal packet sizes divided by bandwidth, the bandwidth can be estimated from the slope of the observed (packet size, RTT/delay) graph.

In further embodiments, a "blackbox method" is used in which, from a database of generic observable parameters and known bandwidths, a statistical model is built to describe bandwidths as a function of the observables. By feeding the trained model with a set of observables for a connection with unknown bandwidth, it can then return an estimate of the bandwidth of the end-to-end connection.

Although in the above described embodiments uplink and downlink bandwidths of an end-to-end connection between a first user terminal and a node are measured, in alternative embodiments only one or other of the uplink and downlink bandwidths of the end-to-end connection are measured.

In some embodiments, it is an end-to-end throughput of datasets or packet trains (which have stream properties) that is measured. There may thus be intolerance to latency and it is preferred that the User Datagram Protocol (UDP) is used for the testing. It will be understood that, in some embodiments, what is measured is the available bandwidth that might be used in a call, and not necessarily a channel bandwidth.

In still further embodiments, a quality characteristic of the end-to-end connection other than bandwidth, such as round trip time, data transfer rate, or packet loss, may be measured and thus a different type of quality information relating to the end-to-end connection may be determined.

It is to be noted that, in some embodiments, the end-to-end connection between the first user terminal and the node (the node being one of a server and a user terminal) does not comprise a call between the first user terminal and the node. Rather, a call with a second user terminal is set up after the quality information relating to the end-to-end connection has been determined.

In the embodiments described above, the first user terminal comprises an apparatus that takes the form of a personal computer, but in other embodiments the first user terminal could be an apparatus comprising one of a mobile telephone and a television or other apparatus connectable to a packet-based communication system to provide a user with an apparatus for interacting with other user terminals connected to the communication system.

Although the above has been described mainly in terms of a peer-to-peer (P2P) system, the present invention is not specific to P2P and may be applied to any kind of packet-based communications system, such as more the centralised VoIP systems mentioned previously. Further, the present invention is not limited to use over the Internet, but could be implemented over any packet-based network.

In preferred embodiments, the processes discussed above are implemented by software stored on a general purpose memory, such as flash memory or hard drive, and executed on an apparatus comprising a general purpose processor, the software preferably but not necessarily being integrated as part of a client application. However, alternatively the processes could be implemented on an apparatus as separate application(s), or in firmware, or even in dedicated hardware.

It is to be noted that some embodiments of the present invention will exist in which features of any of the above described first to fourth embodiments are combined with features of any other one of the first to fourth embodiments.

Other configurations and applications of the present invention may be apparent to the person skilled in the art given the disclosure herein. The scope of the invention is not limited by the described embodiments, but only by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Appendix

TABLE 1

| Message Context | Off-Call Score | On-Call Score | Off-Call Message | On-Call Message |
| --- | --- | --- | --- | --- |
| SO/SI call only (not measured, assumed good to Skype servers) | 5 | 5 | Your connection speed is good Your web connection is fast enough to call and receive calls from a phone or mobile. | Your connection speed is good Your web connection is fast enough to call and receive calls from a phone or mobile. |
| No measurement possible | 0 | 0 | Your connection speed is unknown Skype is unable to measure your connection speed at this time. | Your connection speed is unknown Skype is unable to measure your connection speed at this time. |
| Very Low - not enough for audio call | 1 | 1 | Your connection speed is very slow Your web connection isn't fast enough to make a call. Close any file sharing programs you've got open and stop any downloads or uploads to speed up your connection. | Your connection speed is very slow Your web connection isn't fast enough to make a call. Close any file sharing programs you've got open and stop any downloads or uploads to speed up your connection. |
| Local machine, firewall | N/A | 2 | N/A | Skype has restricted web access Your security firewall might be affecting your calls. Use our ✪ guide to changing your firewall settings or if you're at work, contact your system administrator. |
| Local machine, stop downloads or fix firewall | N/A | 3 | N/A | Restricted web access Close any file sharing programs you've got open and stop any downloads or uploads. Doesn't fix it? It might be your firewall. See our ✪ guide to changing your firewall settings. |
| Low - enough for audio & low quality video | 3 | 3 | Your connection speed is slow Your web connection is fast enough to make audio calls and low quality video calls. Close any file sharing programs you've got open and stop any downloads or uploads to speed up your connection. | Your connection speed is slow Your web connection is fast enough to make audio calls and low quality video calls. Close any file sharing programs you've got open and stop any downloads or uploads to speed up your connection. |
| Local machine, stop downloads | N/A | 3 | N/A | Your web connection is slow Close any file sharing programs you've got open and stop any downloads or uploads to speed up your connection. This should improve your call quality. |
| Local machine, stop downloads, get broadband | 3 | 3 | Your web connection is slow Close any file sharing programs you've got open and stop any downloads or uploads to speed up your connection. This should improve your call quality. Note: Skype works best with a broadband connection. | Your web connection is slow Close any file sharing programs you've got open and stop any downloads or uploads to speed up your connection. This should improve your call quality. Note: Skype works best with a broadband connection. |
| Medium - enough for audio & medium quality video | 4 | 4 | Your connection speed is medium Your web connection is fast enough to make audio calls and medium quality video calls. Close any file sharing programs you've got open and stop any downloads or uploads to speed up your connection. | Your connection speed is medium Your web connection is fast enough to make audio calls and medium quality video calls. Close any file sharing programs you've got open and stop any downloads or uploads to speed up your connection. |
| High - enough for audio & high quality video | 5 | 5 | Your connection speed is fast Your web connection is fast enough to make audio calls and high quality video calls. | Your connection speed is fast Your web connection is fast enough to make audio calls and high quality video calls. |

TABLE 2

| Message Context | Off-Call Score | On-Call Score | Off-Call Message | On-Call Message |
|---|---|---|---|---|
| Microphone | | | | |
| Local, no sound card found | 1 | 1 | Can't detect your sound card<br>Your computer needs a sound card to make audio calls. Try our ☻sound setup guides or plug in a headset that comes with its own sound card. | Can't detect your sound card<br>Your computer needs a sound card to make audio calls. Try our ☻sound setup guides or plug in a headset that comes with its own sound card. |
| Local, sound card found, but cannot be accessed | 1 | 1 | Can't access your sound card<br>Skype needs to access your computer's sound card to make calls. Try restarting your computer to help Skype find your sound card. | Can't access your sound card<br>Skype needs to access your computer's sound card to make calls. Try restarting your computer to help Skype find your sound card. |
| Local mic, muted, not allowed to adjust microphone gain | 1 | 1 | Your microphone is on mute<br>You need to un-mute your microphone to make a call. Select Automatically adjust microphone settings on this screen. Then ☻check your microphone setup on your computer to make sure it's not muted in your volume settings. | Check your microphone<br>Plug in your microphone, switch it on, and check you've selected it in your microphone settings. Check your mic isn't muted in your computer's volume settings, or check you check your microphone for a mute switch and press it. |
| Local mic, input is silent | N/A | 1 | N/A | Check your microphone<br>Plug in your microphone, switch it on, and check you've selected it in your microphone settings. Check your mic isn't muted in your computer's volume settings, or check you check your microphone for a mute switch and press it. |
| Local mic, input is low, can't adjust the microphone gain | N/A | 3 | N/A | Turn your microphone volume up<br>Turn up the volume on your microphone or select Automatically adjust microphone settings on this screen. |
| Local mic, input is low | N/A | 3 | N/A | Can't hear you very well<br>Try moving your microphone closer to your mouth, or turn up the volume on your microphone and select Automatically adjust microphone settings in your audio settings. If your microphone or headset has a mute switch, make sure it is turned off. |
| Local mic, input is overloaded, microphone gain at minimum | N/A | 3 | N/A | Adjust your microphone position<br>Your microphone appears to be too close to your mouth. Please adjust your headset or move your microphone further away from your mouth. |
| Local mic, input is overloaded, not allowed to adjust the microphone gain | N/A | 3 | N/A | Turn your microphone volume down<br>Turn down the volume on your microphone or select Automatically adjust microphone settings in your audio settings. |
| Local mic, speech level low if compared to background noise (low SNR) | N/A | 3 | N/A | You've got background noise<br>Try moving to a quiet location, move your microphone closer to your mouth, or try to speak a little louder. |

TABLE 2-continued

| Message Context | Off-Call Score | On-Call Score | Off-Call Message | On-Call Message |
|---|---|---|---|---|
| Local mic, high background noise level | N/A | 3 | N/A | You've got background noise<br>Try moving to a quiet location or muting your microphone when you're not talking. |
| Local mic, can't adjust settings | 4 | N/A | Skype can't adjust your microphone level<br>Select Automatically adjust microphone settings on this screen. | |
| No issues | 5 | 5 | Your microphone is working correctly<br>Skype isn't picking up any current issues with your microphone. | Your microphone is working correctly<br>Skype isn't picking up any current issues with your microphone. |
| Speakers | | | | |
| Local, no sound card found | 1 | 1 | Can't detect your sound card<br>Your computer needs a sound card to make audio calls. Try our ☺ sound setup guides or plug in a headset that comes with its own sound card. | Can't detect your sound card<br>Your computer needs a sound card to make audio calls. Try our ☺ sound setup guides or plug in a headset that comes with its own sound card. |
| Local, sound card found, but cannot be accessed | 1 | 1 | Can't access your sound card<br>Skype needs to access your computer's sound card to make calls. Try restarting your computer to help Skype find your sound card. | Can't access your sound card<br>Skype needs to access your computer's sound card to make calls. Try restarting your computer to help Skype find your sound card. |
| Local speakers muted | 1 | 1 | Your speakers are on mute<br>You need to un-mute your speakers to make an audio call. Select Automatically adjust speaker settings on this screen. Then open Volume in the taskbar and uncheck Mute all under Volume Control. | Check your speakers<br>Are they on mute? Check they're not muted in your volume settings, or check your speakers for a mute button and press it. Doesn't fix it? Make sure you've selected the correct speakers. |
| Local speaker, echo caused by high volume or mic too close to speakers | N/A | 3 | N/A | Skype has detected an echo<br>Your microphone is picking up too much sound from your speakers. Try to move your microphone away from your speakers and closer to your mouth, or turn your speaker volume down. |
| No issues | 5 | 5 | Your speakers are working correctly<br>Skype isn't picking up any current issues with your speakers. If you still can't hear anything, check that your speakers are switched on and not muted. | Your speakers are working correctly<br>Skype isn't picking up any current issues with your speakers. If you still can't hear anything, check that your speakers are switched on and not muted. |
| Webcam | | | | |
| Non-video call (SO) | 0 | 0 | Video not available<br>You're not able to make video calls to phones and mobiles. | Video not available<br>You're not able to make video calls to phones and mobiles. |
| Non-video call (Conference) | 0 | 0 | Video not available<br>Video conferencing between three or more people isn't available yet. | Video not available<br>Video conferencing between three or more people isn't available yet. |
| No webcam detected | 0 | 0 | Can't detect your webcam<br>Skype can't detect any webcam connected to your computer. If you have a webcam, make sure it's plugged in, switched on and you have installed the latest drivers. | Can't detect your webcam<br>Skype can't detect any webcam connected to your computer. If you have a webcam, make sure it's plugged in, switched on and you have installed the latest drivers. |

TABLE 2-continued

| Message Context | Off-Call Score | On-Call Score | Off-Call Message | On-Call Message |
|---|---|---|---|---|
| Can't connect to webcam/ In-use by other app | 1 | 1 | Skype can't connect to your webcam Please check that another application isn't using your webcam. | Skype can't connect to your webcam Please check that another application isn't using your webcam. |
| Local cam, USB slow | 3 | 3 | Unplug some USB devices Disconnect any USB devices you're not using or plug your webcam into a different USB port on your computer. | Unplug some USB devices Disconnect any USB devices you're not using or plug your webcam into a different USB port on your computer. |
| Local cam, low lighting | N/A | 3 | N/A | Bad lighting You're not sending great video right now because your room is quite dark. Turn on more lights or open the curtains to let more light in. Plus make sure you don't have a bright light or sunny window right behind you. |
| Receiving low quality video (240 × 180) | N/A | 3 | N/A | You're receiving low quality video Your contact is only able to send low quality video due to limitations of their webcam, internet connection or computer speed. |
| Sending low quality video (240 × 180) | 3 | 3 | Your video quality is low Your webcam, internet connection or and computer speed may be limiting the video quality you're able to send on video calls. | Your video quality is low The video quality you are sending is being limited by your webcam, internet connection or computer speed. |
| Receiving medium video quality (320 × 240) | N/A | 4 | N/A | You're receiving medium quality video Your contact is only able to send medium quality video due to limitations of their webcam, internet connection or computer speed. |
| Sending medium video quality (320 × 240) | 4 | 4 | Your video quality is medium You're set up to make audio calls and medium quality video calls. Improve your video quality by getting a faster internet connection, speeding up your computer with more memory, or by using a high quality webcam. | Your video quality is medium The video quality you're sending could be improved by increasing your internet connection or computer speed, or by using a high quality webcam. |
| Receiving high video quality (640 × 480) | N/A | 5 | N/A | You'r receiving high quality video Your contact is sending you high quality video. |
| Sending high video quality (640 × 480) | 5 | 5 | Your video quality is high You're set up to make audio calls and high quality video calls. | Your video quality is high You're currently sending high quality video. |
| CPU | | | | |
| No measurement possible | 0 | 0 | Your computer speed is unknown Skype is unable to measure your computer speed at this time. | Your computer speed is unknown Skype is unable to measure your computer speed at this time. |
| Very Low - not enough for audio call | 1 | N/A | Your computer speed is very slow Your computer is running too slowly to make a call. You can improve your computer speed by closing any other applications you have running. | N/A |
| Local machine, plug in AC power | 3 | 3 | Running on battery? Switch to AC power Your laptop is in power saving mode. To get better sound or video quality, change your computer to AC power or switch your | Running on battery? Switch to AC power Your laptop is in power saving mode. To get better sound or video quality, change your computer to AC power or switch your |

TABLE 2-continued

| Message Context | Off-Call Score | On-Call Score | Off-Call Message | On-Call Message |
|---|---|---|---|---|
| | | | | computer to maximum performance. |
| Local client, high CPU usage | N/A | 3 | N/A | Skype is running slowly Close any Extras, toolbars or other applications that use Skype. If that doesn't help, try quitting Skype then restarting it. |
| Local machine, close other apps | N/A | 3 | N/A | Your computer is running slowly Try closing some of the programs you have open. This should improve your call quality. |
| Low - enough for audio & low quality video | 3 | 3 | Your computer speed is slow Your computer is fast enough to make audio calls and low quality video calls. You can improve your computer speed by closing any other applications you have running. | Your computer speed is slow Your computer is fast enough to make audio calls and low quality video calls. You can improve your computer speed by closing any other applications you have running. |
| Local machine slow, low spec | 2 | 2 | Your computer is running slowly Your computer might be too slow to make clear calls. You really need a 1 GHz processor and at least 256 MB RAM. | Your computer is running slowly Your computer might be too slow to make clear calls. You really need a 1 GHz processor and at least 256 MB RAM. |
| Medium - enough for audio & medium quality video | 4 | 4 | Your computer speed is medium Your computer is fast enough to make audio calls and medium quality video calls. You can improve your computer speed by closing any other applications you have running. | Your computer speed is medium Your computer is fast enough to make audio calls and medium quality video calls. You can improve your computer speed by closing any other applications you have running. |
| High - enough for audio & high quality video | 5 | 5 | Your computer speed is fast Your computer is fast enough to make audio calls and high quality video calls. | Your computer speed is fast Your computer is fast enough to make audio calls and high quality video calls. |

What is claimed is:

1. A method for estimating a quality of a call in which a first user terminal will comprise an end point, the method comprising:
   establishing an end-to-end connection between the first user terminal and a node, the end-to-end connection via an access point of a network by which the first user terminal is connected to the network;
   determining information indicative of a quality of the end-to-end connection by:
      determining a transmission time for each of a plurality of packets in a queue received at the first user terminal based on information received with the packets;
      determining a reception time for each of the plurality of packets;
      receiving, at an estimation function, successive sets of observations, each set of observations including transmission time, reception time, and packet size; and
      determining the information indicative of the quality of the end-to-end connection using a relationship between the information indicative of the quality of the end-to-end connection, an amount of data in the queue, packet size, and an interval between packet transmissions;
   displaying a score that indicates an expected quality of a call in which the first user terminal will comprise the end point based on the information indicative of a quality of the end-to-end connection; and
   providing call initiation means for enabling a user to selectively establish a call between the first user terminal and a callee.

2. A method according to claim 1 further comprising sending, from the first user terminal to another user terminal, the information indicative of the quality of the end-to-end connection between the first user terminal and the node.

3. A method according to claim 1 further comprising receiving, at the first user terminal from another user terminal, additional information indicative of a quality of a second end-to-end connection between the another user terminal and a node.

4. A method according to claim 3, further comprising displaying an additional score that indicates an expected quality of a call in which the first user terminal and the another user terminal will comprise the end points based on the information indicative of the quality of the end-to-end connection between the first user terminal and the node and the additional information indicative of the quality of the second end-to-end connection.

5. A method according to claim 1, wherein the node comprises one of a server and a user terminal other than a user terminal of the callee.

6. A method according to claim 1, further comprising establishing plural respective end-to-end connections between the first user terminal and a plurality of respective nodes via the access point;
   wherein the score that indicates the expected quality of the call in which the first user terminal will comprise the end point is determined based on information indicative of a quality of the respective end-to-end connections.

7. A method according to claim 1, further comprising:
   determining, at the first user terminal, information relating to a potential callee;

wherein the end-to-end connection between the first user terminal and the node is established based on the information relating to the potential callee;

wherein the displaying the score further comprises displaying information indicative of an expected quality of a call between the first user terminal and the potential callee; and wherein the providing call initiation means comprises providing call initiation means for enabling the user to selectively establish a call with the potential callee.

8. A method according to claim 1, further comprising determining, at the first user terminal, the information indicative of the quality of the end-to-end connection between the first user terminal and the node.

9. A method according to claim 1, further comprising receiving, at the first user terminal, the information indicative of the quality of the end-to-end connection between the first user terminal and the node.

10. A method according to claim 1, wherein the information indicative of the quality of the end-to-end connection between the first user terminal and the node comprises information indicative of the quality of the end-to-end connection in an uplink direction from the first user terminal to the node.

11. A method according to claim 1, wherein the information indicative of the quality of the end-to-end connection between the first user terminal and the node comprises information indicative of the quality of the end-to-end connection in a downlink direction towards the first user terminal from the node.

12. A method according to claim 1, wherein the information indicative of the quality of the end-to-end connection between the first user terminal and the node is determined using a method that determines the round trip time over the end-to-end connection between the first user terminal and the node.

13. A method according to claim 1, wherein the call comprises one or both of a voice over internet protocol call and a video over internet protocol call.

14. A method according to claim 6, wherein the plurality of respective nodes comprises a plurality of user terminals.

15. A method according to claim 6, wherein the plurality of respective nodes comprises a plurality of servers.

16. A method according to claim 7, wherein the node comprises a user terminal of the potential callee.

17. A method according to claim 7, wherein the node comprises one of a server and a user terminal other than a user terminal of the potential callee.

18. A method according to claim 7, further comprising receiving, at the first user terminal, the information relating to the potential callee.

19. A method according to claim 7, wherein the information relating to the potential callee comprises an indication of an identity of the potential callee.

20. A method according to claim 7, further comprising selecting the node based on the information relating to the potential callee.

21. A method for estimating a quality of a call between a first user terminal and a potential callee, the method comprising:
determining an indication of a quality of the end-to-end connection between the first user terminal and the potential callee by:
determining a transmission time for each of a plurality of packets in a queue received at the first user terminal based on information received with the packets;
determining a reception time for each of the plurality of packets;

receiving, at an estimation function, successive sets of observations, each set of observations including transmission time, reception time, and packet size; and determining the information indicative of the quality of the end-to-end connection using a relationship between the information indicative of the quality of the end-to-end connection, an amount of data in the queue, packet size, and an interval between packet transmissions;

displaying a score that indicates an expected quality of a call between the first user terminal and the potential callee based on the indication of the quality of the end-to-end connection; and providing call initiation means for enabling a user to selectively establish a call with the potential callee.

22. A method according to claim 21, further comprising receiving, at the first user terminal, the indication of the quality of an end-to-end connection.

23. A method according to claim 21, further comprising sending, from the first user terminal, information indicative of a quality of a local connection by which the first user terminal is connected to a network.

24. A method according to claim 21, comprising receiving, at the first user terminal, information indicative of a quality of a local connection by which a second user terminal of the potential callee is connected to a network.

25. A method according to claim 21, wherein said determining the indication of the quality of the end-to-end connection is determined based on one or both of information indicative of a quality of a local connection by which the first user terminal is connected to a network, and information indicative of a quality of a local connection by which the second user terminal is connected to a network.

26. A computer program product for estimating the quality of a call in which a first user terminal will comprise an end point, the program comprising code embodied on a computer-readable medium arranged so as, when executed on a processor, to implement a method as in claim 1, the computer-readable medium not comprising a signal.

27. A computer program product for estimating the quality of a call between a first user terminal and a potential callee, the program comprising code embodied on a computer-readable medium arranged so as, when executed on a processor, to implement a method as in claim 21, the computer-readable medium not comprising a signal.

28. An apparatus for estimating a quality of a call in which a first user terminal will comprise an end point, the apparatus comprising:
a processor; and
a computer-readable medium, the computer-readable medium not comprising a signal and having stored thereon code that, when executed by the processor, is configured to:
establish an end-to-end connection between the first user terminal and a node, the end-to-end connection via an access point of a network by which the first user terminal is connected to the network;
determine information indicative of a quality of the end-to-end connection by:
determining a transmission time for each of a plurality of packets in a queue received at the first user terminal based on information received with the packets;
determining a reception time for each of the plurality of packets;

receiving, at an estimation function, successive sets of observations, each set of observations including transmission time, reception time, and packet; and determining the information indicative of the quality of the end-to-end connection using a relationship between the information indicative of the quality of the end-to-end connection, an amount of data in the queue, packet size, and an interval between packet transmissions;

cause a score that indicates an expected quality of a call in which the first user terminal will comprise the end point to be displayed based on the information indicative of a quality of the end-to-end connection; and enable a user to selectively establish a call between the first user terminal and a callee.

29. An apparatus according to claim 28, wherein the code, when executed by the processor, is further configured to determine, at the first user terminal, information relating to a potential callee;

wherein the establishing the end-to-end connection between the first user terminal and the node further comprises establishing the end-to-end connection based on the information relating to a potential callee;

wherein the causing the score to be displayed comprises causing information indicative of an expected quality of a call between the first user terminal and the potential callee to be displayed; and wherein the enabling comprises enabling a user to selectively establish a call with the potential callee.

30. An apparatus for estimating a quality of a call between a first user terminal and a potential callee, the apparatus comprising:

a processor; and a computer-readable medium, the computer-readable medium not comprising a signal and having stored thereon code that, when executed by the processor, is configured to:

determine information indicative of a quality of the end-to-end connection by:

determining a transmission time for each of a plurality of packets in a queue received at the first user terminal based on information received with the packets;

determining a reception time for each of the plurality of packets;

receiving, at an estimation function, successive sets of observations, each set of observations including transmission time, reception time, and packet size; and determining the information indicative of the quality of the end-to-end connection using a relationship between the information indicative of the quality of the end-to-end connection, an amount of data in the queue, packet size, and an interval between packet transmissions;

determine an indication of a quality of the end-to-end connection between the first user terminal and the potential callee based on the determined information;

cause a score that indicates an expected quality of a call between the first user terminal and the potential callee to be displayed based on the indication of the quality of the end-to-end connection; and enable a user to selectively establish a call with the potential callee.

31. A method for estimating a quality of a call in which a first user terminal will comprise an end point, the method comprising:

establishing an end-to-end connection between the first user terminal and a node, the end-to-end connection via an access point of a network by which the first user terminal is connected to the network;

displaying information indicative of an expected quality of a call in which the first user terminal will comprise the end point based on information indicative of a quality of the end-to-end connection, the information indicative of the quality of the end-to-end connection determined by:

determining a transmission time for each of a plurality of packets in a queue received at the first user terminal based on information received with the packets;

determining a reception time for each of the plurality of packets;

receiving, at an estimation function, successive sets of observations including in each set transmission time, reception time and packet size; and determining the information indicative of the quality of the end-to-end connection by using a relationship between the information indicative of the quality of the end-to-end connection, an amount of data in the queue, packet size, and an interval between packet transmissions; and providing call initiation means for enabling a user to selectively establish a call between the first user terminal and a callee.

32. A method for estimating a quality of a call in which a first user terminal will comprise an end point, the method comprising:

establishing an end-to-end connection between the first user terminal and a node, the end-to-end connection via an access point of a network by which the first user terminal is connected to the network;

displaying information indicative of an expected quality of a call in which the first user terminal will comprise the end point based on information indicative of a quality of the end-to-end connection, the information indicative of the quality of the end-to-end connection determined by:

determining a transmission time for each of a plurality of packets in a queue, each packet having a packet size based on data in the packet;

receiving a reception time for each packet, based on a reception clock located at the node;

receiving, at an estimation function, successive sets of observations including in each set transmission time, reception time and packet size; and determining the information indicative of the quality of the end-to-end connection by using a relationship between the information indicative of the quality of the end-to-end connection, an amount of data in the queue, packet size, and an interval between packet transmissions; and providing call initiation means for enabling a user to selectively establish a call between the first user terminal and a callee.

* * * * *

UNITED STATES PATENT AND TRADEMARK OFFICE
CERTIFICATE OF CORRECTION

PATENT NO. : 8,670,336 B2
APPLICATION NO. : 12/800601
DATED : March 11, 2014
INVENTOR(S) : Mihails Velenko et al.

It is certified that error appears in the above-identified patent and that said Letters Patent is hereby corrected as shown below:

At item 73 on the patent title page, please correct the Assignee from "Microsoft Corporation, Redmond, WA (US)" to "Skype, Dublin, (IE)"

Signed and Sealed this
Ninth Day of December, 2014

Michelle K. Lee
*Deputy Director of the United States Patent and Trademark Office*